(12) United States Patent
Boldyrev et al.

(10) Patent No.: US 8,874,747 B2
(45) Date of Patent: Oct. 28, 2014

(54) METHOD AND APPARATUS FOR LOAD BALANCING IN MULTI-LEVEL DISTRIBUTED COMPUTATIONS

(75) Inventors: Sergey Boldyrev, Söderkulla (FI); Hannu Ensio Laine, Espoo (FI); Jari-Jukka Harald Kaaja, Järvenpää (FI); Jukka Honkola, Espoo (FI); Vesa-Veikko Luukkala, Espoo (FI); Ian Justin Oliver, Söderkulla (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 12/979,112

(22) Filed: Dec. 27, 2010

(65) Prior Publication Data

US 2012/0166645 A1 Jun. 28, 2012

(51) Int. Cl.
*G06F 15/16* (2006.01)
*G06F 9/50* (2006.01)

(52) U.S. Cl.
CPC .................................... *G06F 9/5083* (2013.01)
USPC ........................................................ 709/226

(58) Field of Classification Search
USPC ........................................................ 709/226
See application file for complete search history.

(56) References Cited

U.S. PATENT DOCUMENTS

| | | | |
|---|---|---|---|
| 6,983,463 B1 | 1/2006 | Hunt | |
| 7,127,625 B2 | 10/2006 | Farkas et al. | |
| 7,454,427 B2 | 11/2008 | Jackson | |
| 7,693,991 B2 | 4/2010 | Greenlee et al. | |
| 8,266,192 B2 * | 9/2012 | Nemoto et al. | 707/821 |
| 2003/0084156 A1 | 5/2003 | Graupner et al. | |
| 2005/0132239 A1 | 6/2005 | Athas et al. | |
| 2005/0283786 A1 | 12/2005 | Dettinger et al. | |
| 2007/0168919 A1 | 7/2007 | Henseler et al. | |
| 2008/0082546 A1 | 4/2008 | Meijer et al. | |
| 2010/0115606 A1 | 5/2010 | Samovskiy et al. | |
| 2010/0169477 A1 | 7/2010 | Stienhans et al. | |
| 2010/0241827 A1 | 9/2010 | Yu et al. | |

(Continued)

FOREIGN PATENT DOCUMENTS

WO    WO 2010/030489 A2    3/2010

OTHER PUBLICATIONS

International Search Report for related PCT Application No. PCT/FI2011/050988 dated Feb. 27, 2012, pp. 1-6.

(Continued)

*Primary Examiner* — Douglas Blair
(74) *Attorney, Agent, or Firm* — Ditthavong & Steiner, P.C.

(57) ABSTRACT

An approach is provided for providing load balancing in multi-level distributed computations. A distributed computation control platform determines closure capability data associated with respective levels of a computational architecture, wherein the respective levels include, at least in part, a device level, an infrastructure level, and a cloud computing level. The distributed computation control platform also determines functional flow information of the respective levels, one or more nodes of the respective levels, or a combination thereof with respect to at least one set of one or more computation closures. The distributed computation control platform further determines to cause, at least in part, processing at least the closure capability data, the functional flow information, or a combination thereof to determine: (a) a distribution of the one or more computation closures among the respective levels, (b) the one or more nodes, or (c) a combination thereof.

20 Claims, 17 Drawing Sheets

(56) References Cited

U.S. PATENT DOCUMENTS

| | | | |
|---|---|---|---|
| 2010/0248698 A1 | 9/2010 | In et al. | |
| 2010/0332629 A1 | 12/2010 | Cotugno et al. | |
| 2011/0016214 A1* | 1/2011 | Jackson | 709/226 |
| 2011/0270968 A1* | 11/2011 | Salsburg et al. | 709/224 |
| 2012/0110185 A1* | 5/2012 | Ganesan et al. | 709/226 |
| 2012/0130936 A1* | 5/2012 | Brown et al. | 706/52 |
| 2012/0198253 A1* | 8/2012 | Kato et al. | 713/320 |

OTHER PUBLICATIONS

International Search Report for related PCT Application No. PCT/FI2011/050989 dated Mar. 30, 2012, pp. 1-6.
Written Opinion for related PCT Application No. PCT/FI2011/050988 dated Feb. 27, 2012, pp. 1-10.
Written Opinion for related PCT Application No. PCT/FI2011/050989 dated Mar. 30, 2012, pp. 1-8.
Berl, et al., "Energy-Efficient Cloud Computing," The Computer Journal, Aug. 19, 2009, pp. 1-7.
Lee, et al., "Energy efficient utilization of resources in cloud computing systems," Center for Distributed and High Performance Computing, Mar. 19, 2010, pp. 1-13.
U.S. Appl. No. 12/825,043, Jun. 28, 2010, Sergey Boldyrev et al.
U.S. Appl. No. 12/829,923, Jul. 2, 2010, Sergey Boldyrev et al.
U.S. Appl. No. 12/916,009, Oct. 29, 2010, Ian Justin Oliver et al.
U.S. Appl. No. 12/979,144, Dec. 27, 2010, Boldyrev, Sergey.
U.S. Appl. No. 61/387,252, Sep. 28, 2010, Ian Justin Oliver et al.
A Survey of Load Balancing in Grid Computing, Li et al., in CIS 2004, LNCS 3314, Zhang et al. (eds.), Springer-Verlag Berlin Heidelberg, pp. 280-285.
User Modeling Servers—Requirements, Design, and Evaluation, von Josef Fink, Dissertation, Jul. 15, 2003, http://duepublico.uni-duisburg-essen.de/servlets/DerivateServlet/Derivate-11829, pp. 1-205.

* cited by examiner

METHOD AND APPARATUS FOR LOAD BALANCING IN MULTI-LEVEL DISTRIBUTED COMPUTATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still there are challenges in certain example implementations to achieve scalable high context information processing within such heterogeneous environments. For example, in various implementations, due to distributed nature of the cloud, exchange of data, information, and computation elements (e.g., computation closures) among distributed devices involved in a cloud infrastructure may require excessive amount of resources (e.g. process time, process power, storage space, etc.). In various example circumstances, to enhance the information processing power of a device and reduce the processing cost, one might consider minimizing or at least significantly improving exchange of data, information and computations among the distributed devices. In various example embodiments we can minimize or improve or significantly improve data migration within a computational architecture by providing multi-level distributed computations, such that the data can be migrated to the closest possible computation level with minimized or improved cost. However, unbalanced distribution of computations within a computation architecture may cause congestions in parts of the architecture while there may be unused available resources in other parts of the architecture. Furthermore, under certain conditions some of the resources within the architecture may become unavailable, for example due to faults, failures, heavy transaction load, etc.

SOME EXAMPLE EMBODIMENTS

Therefore, there is a need for an approach for computation migration within a computational architecture such that the data can be migrated to the closest possible computation level with minimized or improved cost while factors such as resource availability, congestion, load, etc. are taken in to account. In order to optimize the execution of computation closures, factors such as load balancing status, closure execution capabilities available at each part of the computational architecture, functional flow specifications, cost functions, network communication rule, etc. need to be detected, identified and determined and the decision for distribution of closures for execution, made based on the determined factors.

According to one embodiment, a method comprises determining closure capability data associated with respective levels of a computational architecture, wherein the respective levels include, at least in part, a device level, an infrastructure level, and a cloud computing level. The method also comprises determining functional flow information of the respective levels, one or more nodes of the respective levels, or a combination thereof with respect to at least one set of one or more computation closures. The method further comprises determining to cause, at least in part, processing at least the closure capability data, the functional flow information, or a combination thereof to determine a distribution of the one or more computation closures among the respective levels, the one or more nodes, or a combination thereof.

According to another embodiment, an apparatus comprises at least one processor, and at least one memory including computer program code, the at least one memory and the computer program code configured to, with the at least one processor, cause, at least in part, the apparatus to determine closure capability data associated with respective levels of a computational architecture, wherein the respective levels include, at least in part, a device level, an infrastructure level, and a cloud computing level. The apparatus is also caused to determine functional flow information of the respective levels, one or more nodes of the respective levels, or a combination thereof with respect to at least one set of one or more computation closures. The apparatus is further caused to determine to cause, at least in part, processing of at least the closure capability data, the functional flow information, or a combination thereof to determine a distribution of the one or more computation closures among the respective levels, the one or more nodes, or a combination thereof.

According to another embodiment, a computer-readable storage medium carries one or more sequences of one or more instructions which, when executed by one or more processors, cause, at least in part, an apparatus to determine closure capability data associated with respective levels of a computational architecture, wherein the respective levels include, at least in part, a device level, an infrastructure level, and a cloud computing level. The apparatus is also caused to determine functional flow information of the respective levels, one or more nodes of the respective levels, or a combination thereof with respect to at least one set of one or more computation closures. The apparatus is further caused to determine to cause, at least in part, processing of at least the closure capability data, the functional flow information, or a combination thereof to determine a distribution of the one or more computation closures among the respective levels, the one or more nodes, or a combination thereof.

According to another embodiment, an apparatus comprises means for determining closure capability data associated with respective levels of a computational architecture, wherein the respective levels include, at least in part, a device level, an infrastructure level, and a cloud computing level. The apparatus also comprises means for determining functional flow information of the respective levels, one or more nodes of the respective levels, or a combination thereof with respect to at least one set of one or more computation closures. The apparatus further comprises means for determining to cause, at least in part, processing at least the closure capability data, the functional flow information, or a combination thereof to determine a distribution of the one or more computation closures among the respective levels, the one or more nodes, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing load balancing in multi-level distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
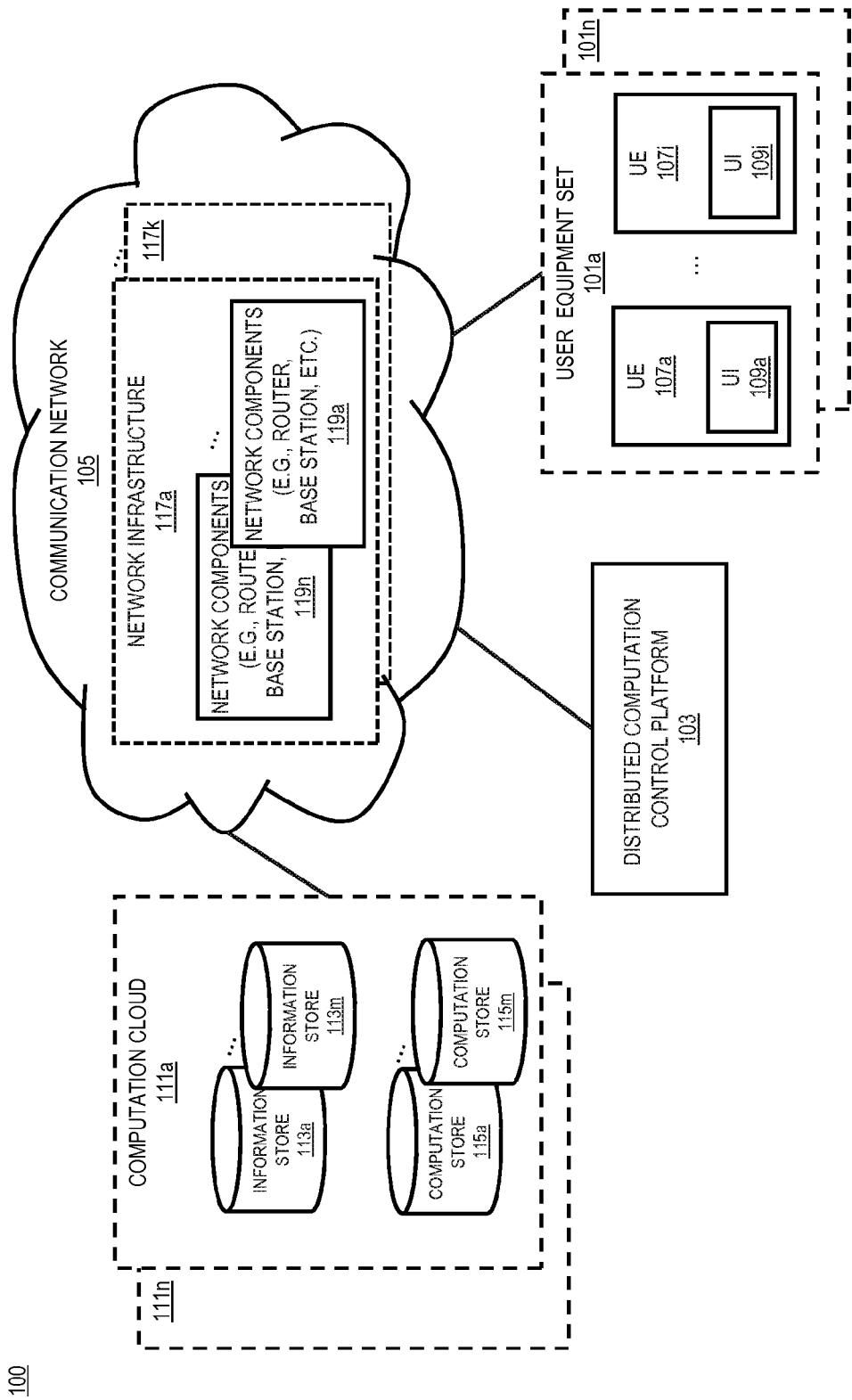
FIG. 1 is a diagram of a system capable of providing load balancing in multi-level distributed computations, according to one embodiment.

FIG. 1 is a diagram of a system capable of providing load balancing in multi-level distributed computations, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for load balancing, without having to access the cloud level, if load balancing cost is lower at infrastructure level. Alternatively, a device may have direct computational closure connectors to cloud level, where devices are more tightly linked to cloud environment for load balancing purposes.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud, who connects to the cloud via one or more user devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Therefore, execution of computation closures associated with a process related to a device at the infrastructure level can provide services to device users in a more efficient manner. However, resources such as processing environments, storages, etc. within the multi-level architectural environment of device level, infrastructure level and cloud level each may differ in configuration, availability, processing power, storage volume, communication capability, etc. Because of this diversity, load balancing and even distribution of workload across components of an architectural level or among different levels becomes a very critical issue.

To address this problem, a system 100 of FIG. 1 introduces the capability to provide load balancing in multi-level distributed computations. A computational architecture environment consists of different levels of proactive computational elements available for various levels of the architecture such as device level, infrastructure level, and cloud computing level. Since these computational elements provide various levels of functionality for each of the levels, providing different levels of migration of the computational closures within the architecture enables the execution of the computational closures after the least required level of migration. However, a very important functionality for optimizing execution of computational closures are to detect, identify, and determine load balancing, including what closure capabilities are available at each part of the multi-level computational levels and components and what is the efficient distribution of closures.

In one embodiment, different components of each architectural level support different types of closures. Each component (e.g. infrastructure component, node) may have a number of previously created entities, closures and links for the computation of the closures such as connectors between closures, multiple branches, interaction points, rules, etc. Furthermore, the computations can be requested to be transferred and/or expanded from one component to another or from an architectural level to another (e.g. from infrastructure to cloud)

In one embodiment, a cloud may include a superset of closure elements (e.g. closure primitives) while the infrastructure or device level components may have subsets of, and therefore the cloud may be capable of supporting computational closures more effectively compared to the infrastructure or device levels. In other embodiments, computational closure packets can be expanded to proper components via load balancing.

In one embodiment, device setup at various architectural levels such as battery consumption, quality of service (QOS) settings, class of service (COS) settings, priority settings etc., may affect the direction and method of computational closure distribution, as different setups may lead to different situations of resource availability. Additionally, cost of load balancing can be indirectly affected by other features of architectural levels such as energy consumption strategies, privacy settings, security enforcements, etc. On the other hand, load balancing between different architectural levels and components can be achieved by different levels of computation migration.

In one embodiment, certain amount of load balancing functionality can be transferred from device level to infrastructure level or further to cloud level depending on the available capabilities of each level. For example, device level may be equipped with a high speed/high capacity Radio Frequency (RF) memory tag which provides an additional component for device level computation. In this embodiment, access to the RF memory tag may reduce the need for computation migration to other levels, since the RF memory tag can be used as a resource for computations.

As shown in FIG. 1, the system 100 comprises a set 101 of user equipments (UEs) 107$a$-107$i$ having connectivity to distributed computation control platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107$a$-107$i$ are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107$a$-107$i$ are respectively equipped with one or more user interfaces (UI) 109$a$-109$i$. Each UI 109$a$-109$i$ may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular migration. In one embodiment, granular migration enables processes to be implicitly or explicitly migrated between devices, computation clouds, and other infrastructure.

In one embodiment, process migration can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, process migration may be triggered via gesture recognition, wherein the user preselects a particular set of UI elements and makes a gesture to simulate "pouring" the selected UE elements from one device to another. In other embodiments, process migration may be initiated automatically without direct user involvement and based on default setup by the manufacturer of the UE 107$a$-107$i$, previous setup by the user of the UE, default setup in an application activated on or associated with a UE 107$a$-107$i$, or a combination thereof.

As seen in FIG. 1, a user of UEs 107$a$-107$i$ may own, use, or otherwise have access to various pieces of information and computations distributed over one or more computation clouds 111$a$-111$n$ in information stores 113$a$-113$m$ and computation stores 115$a$-115$m$ where each of the one or more computation spaces 115$a$-115$m$ include multiple sets of one or more computation closures.

In one embodiment, the communication network 105 consists of one or more infrastructures 117$a$-117$k$ wherein each infrastructure is a designed communication system including multiple components 119$a$-119$n$. The components 119$a$-119$n$ include backbones, routers, switches, wireless access points, access methods, protocols, etc. used for communication within the communication network 105 or between communication network 105 and other networks.

In one embodiment, the distributed computation control platform 103 controls the distribution of computations associated with UEs 107$a$-107$i$ to other components or levels of the architecture including the infrastructure level 117$a$-117$k$ within the environment of the communication network 105, and the cloud level 111a-111n.

In one embodiment, computation distribution control includes load balancing which may be initiated by the user, or based on a background activity for example by triggering a sequence of computation closures which in turn support load balancing action. Prior to load balancing the capabilities available for performing the load balancing function are evaluated. If capabilities are not satisfactory or changes are found, the evaluation process will be repeated until proper capabilities become available. The capabilities may be found in the same or other levels of the computational architecture and the computation closure execution will be performed at the level where available capabilities are found.

In another embodiment, network components 119a-119n may provide different levels of functionality. For example, some components 119a-119n may provide static computational closures while others may provide dynamic computational closures. As used herein, static computational closures are closures with predetermined configurations while dynamic computational closures are closures that may function differently based on dynamic factors such as time, traffic load, type of available power resource, etc. A dynamic computation closure may adjust itself based on the dynamic factor by modifying parameters such as the amount of reserved resources.

In one embodiment the amount and type of available computational closures at a component of the infrastructure 117a-117k may or may not be aligned with the required computation closures by UE 107a-107i through a one to one mapping. This means that the component may need to locate (request) further computational elements from current or next layer or level of the architecture. In other words, if the computation closures between a process and its processing environment are not directly aligned, the processing environment may expand its computation closures (for dynamic closures) or request additional computational closures from other components (for static closures) or a combination thereof. In one embodiment, if neither the direct alignment succeeds nor additional closures found, the setup may be aligned with lower computation requirements. The requirements may be lowered, for example by dropping part of the computational components, reducing media requirements (e.g. reduction of multimedia to voice only or decreasing speed requirements). Additionally, the satisfaction threshold may be lowered (with service provider and user's agreement) so that a lower level of load balancing setup can be considered as satisfactory.

In one embodiment, the computational closures available in multiple levels of device level 101a-101n, infrastructure level 117a-117k, and cloud level 111a-111n are either aligned, meaning that all the computational closures are available in every level, or a super-set of all computational closures is available at cloud level while each lower level has access to a sub-set of the computational closures from its higher level, for example infrastructure level computational closures may be a sub-set of the closures of cloud level and device level closures a sub-set of the infrastructure level closures.

By way of example, the UE 107, and the distributed computation control platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
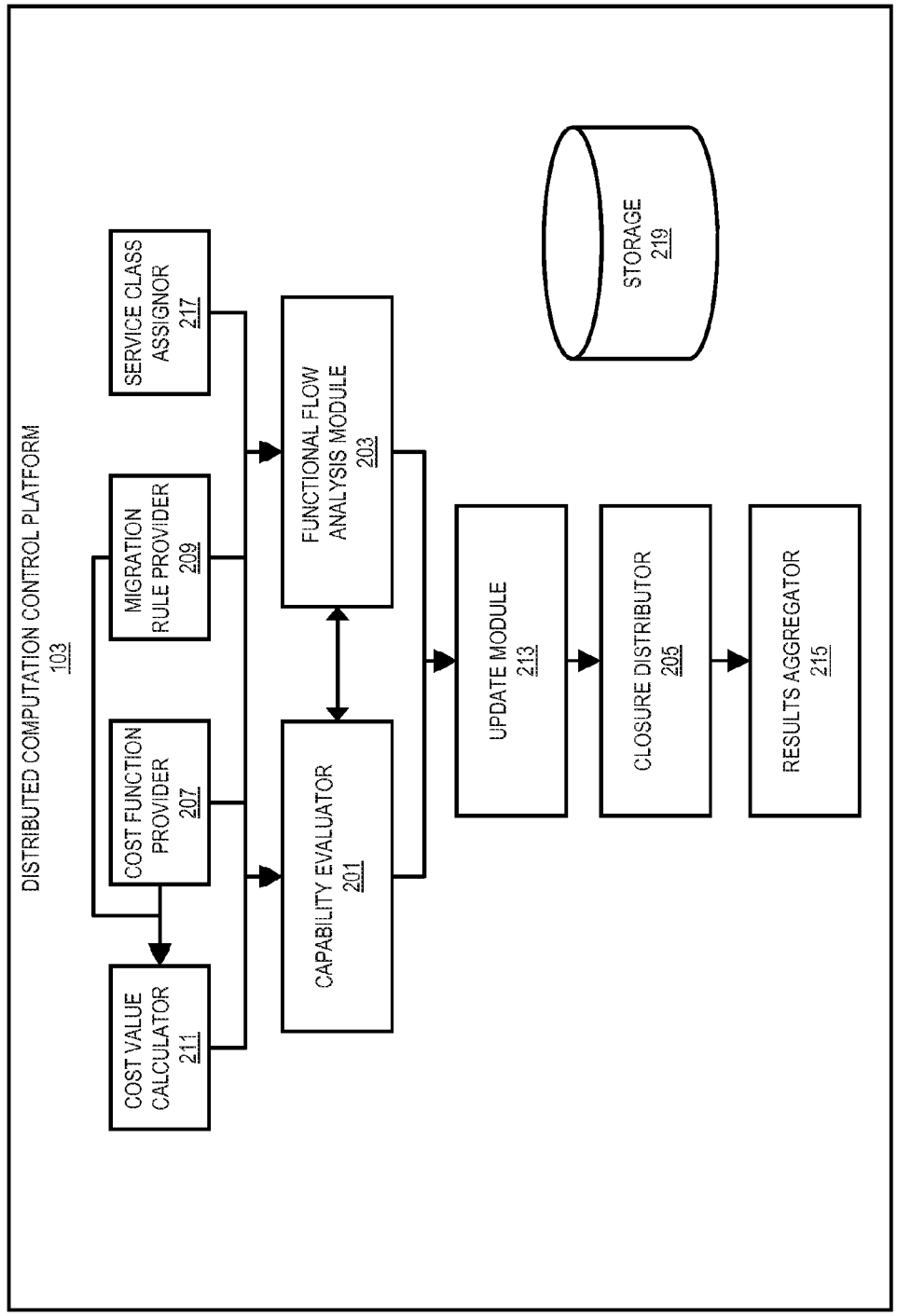
FIG. 2 is a diagram of the components of distributed computation control platform, according to one embodiment.

FIG. 2 is a diagram of the components of distributed computation control platform, according to one embodiment. By way of example, the distributed computation control platform 103 includes one or more components for providing load balancing in multi-level distributed computations. It is contemplated that the functions of these components may be combined in one or more components or performed by other components of equivalent functionality. In this embodiment, the distributed computation control platform 103 includes a capability evaluator 201, a functional flow analysis module 203, a closure distributor 205, a cost function provider 207, a migration rule provider 209, a cost value calculator 211, an update module 213, a result aggregator 215, a service class assignor 217, and a storage 219.

Figure 3:
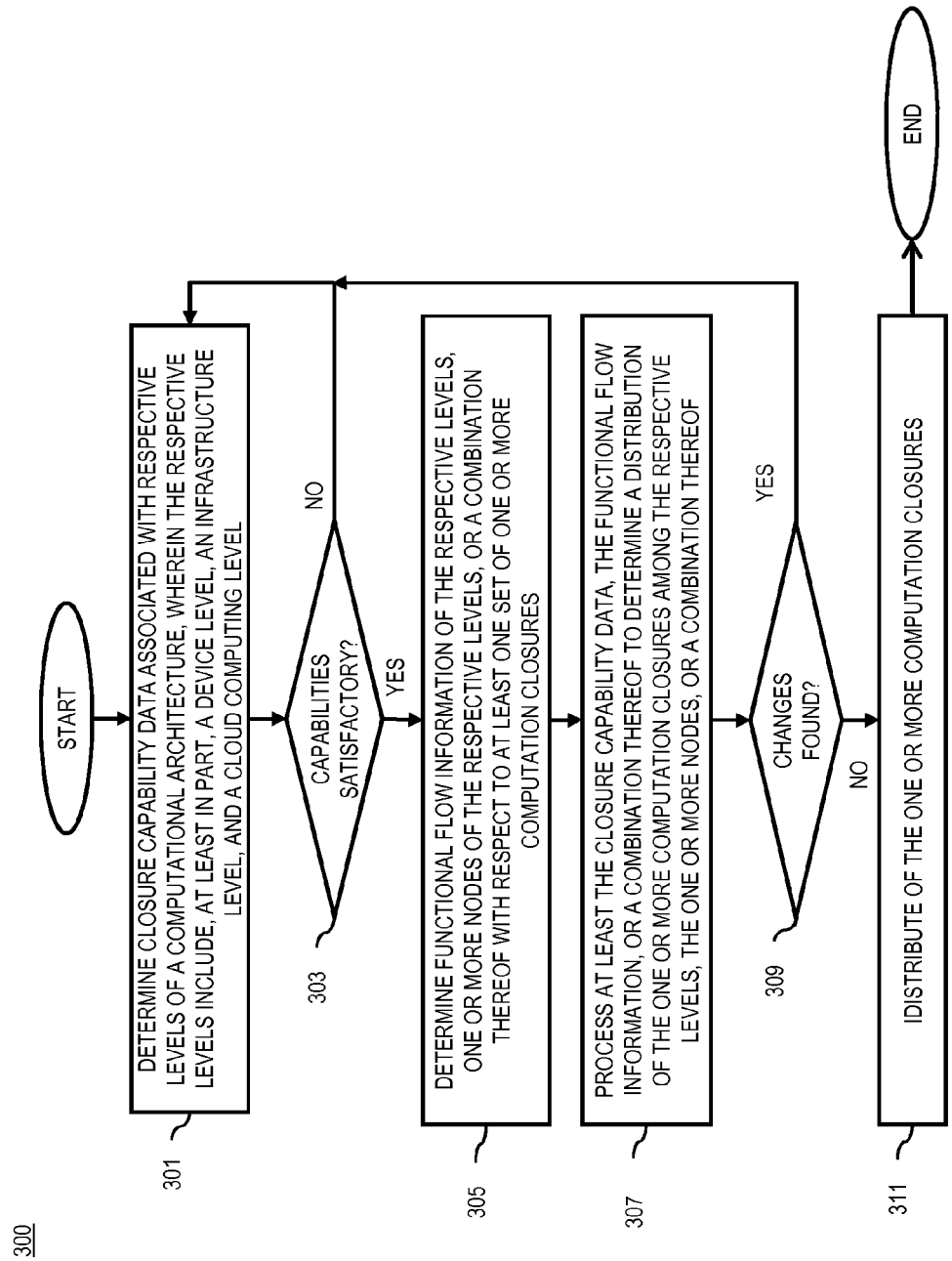
FIG. 3 is a flowchart of a process for providing load balancing in multi-level distributed computations, according to one embodiment.

FIG. 2 is described with reference to FIG. 3, wherein FIG. 3 shows a flowchart 300 of a process for providing multi-level distributed computations, according to one embodiment. In one embodiment, following the start of the execution of a process (for example, associated with an application related to UE 107) the distributed computation control platform 103 is assigned with the task of controlling the distribution of computations related to the process. The computation distribution may be initiated by the user of UE 107, automatically by UE 107 based on pre-determined settings, by other devices or components associated to UE 107, or a combination thereof. Furthermore, the initiation of computation distribution may trigger the activation of distributed computation control platform 103.

In one embodiment, capability evaluator 201 of the distributed computation control platform 103 determines closure capability data associated with respective levels of a computational architecture 100, wherein the respective levels include, at least in part, a device level 101a-101n, a infrastructure level 117a-117k, and a cloud computation level 111a-111n (per step 301 of FIG. 3). The determined capabilities can be utilized for deciding at which level each computation should be executed. In one embodiment, the capability evaluator 201 may determine closure capabilities following the start of process distribution. In other embodiments, the capability evaluator 201 may periodically (e.g., based on an initial setup) determine closure capability data associated with different levels of the architecture, store the determined data in storage 219, in information stores 113a-113m of clouds 111a-111n, or a combination thereof, and retrieve/reuse the stored data when needed. The capability evaluator 201 may determine and store the closure capabilities in Resource Description Framework (RDF) format. In one embodiment, if the determined capabilities are unsatisfactory (the required capabilities are not met) the capability evaluator 201 may continue evaluating other components (e.g. devices, infrastructure nodes, clouds) until the proper capabilities is found. This shown at step 303 of FIG. 3

As shown in step 305 of FIG. 3, in one embodiment, the functional flow analysis module 203 determines functional flow information of the respective levels, including a device level 101a-101n, a infrastructure level 117a-117k, and a cloud computation level 111a-111n, one or more components of the respective levels, or a combination thereof with respect to at least one set of one or more computation closures, wherein the at least one set of one or more computation closures may be a set of computations associated with a process that is going to be executed in a distributed fashion. The functional flow can be utilized to identify the computational closures that should be executed at each step of the process. The functional flow analysis module 203 may store the determined data in storage 219, in information stores 113a-113m of clouds 111a-111n, or a combination thereof, and retrieve/reuse the stored data when needed.

In one embodiment, the closure distributor 205 determining to cause, at least in part, processing at least the closure capability data, determined by the capability evaluator 201, the functional flow information, determined by the functional flow analysis module 203, or a combination thereof (per step 307 of FIG. 3), to determine a distribution of the one or more computation closures among the respective levels, (device level 101a-101n, infrastructure level 117a-117k, cloud computation level 111a-111n), the one or more components, or a combination thereof.

In one embodiment, at any step of computation distribution if any changes in the capabilities, functional flows, or any other parameters of the network are recognized as seen in step 309 of FIG. 3 (e.g., power shut down, fault in a component, etc.) which may affect the distribution process, the capability evaluator 201 will reevaluate the capabilities and the process of FIG. 3 will restart from step 301. Alternatively if no change occurs, in step 311 the distribution process may be performed.

In one embodiment, the capability evaluator 201 and the functional flow analysis module 203 determine the closure capability and functional flow information, based, at least in part on, at least one cost function at least one computation migration rule, or a combination thereof, wherein the processing of at least the closure capability data, the functional flow information, or a combination by the closure distributor 205 is further based, at least in part, on the at least one cost function, the at least one computation migration rule, or a combination thereof.

In one embodiment, the cost functions, used by the capability evaluator 201 and functional flow analysis module 203, are provided by a cost function provider 207. The cost functions may be defined by device manufacturers, distributed system management, service providers, or a combination thereof. One or more cost functions may be assigned to each architectural level or to every component of an architectural level. Furthermore, definition of a cost function may take into consideration various factors affecting the cost of computations on a certain component or an architectural level such as energy consumption, energy cost, privacy and/or security enforcement measures, processing power/speed, etc.

In one embodiment, the closure capability data may includes, at least in part, data related to one or more computational branches (a part of computation that is executed, for example, in a component (node) of the infrastructure), one or more computational elements (one or more closures that comprise a process), one or more resources (processor, storage, power, etc.), or a combination thereof associated with the respective levels, the one or more components, or a combination thereof.

In one embodiment, the process of load balancing may start at device level (UE level) wherein the first branch of computational closures are executed within the device while higher levels of infrastructure level and cloud level are investigated for higher capabilities for load balancing. In another embodiment, the direction of load balancing may be top-down starting at the cloud level, continuing at infrastructure level and ending at device level. For example, the starting point for a service setup may be from cloud side, wherein cloud services can be segmented and processed at the infrastructure level or device level, since local computational aspects make it more beneficial to spread computations between infrastructures or devices rather than in cloud.

In another embodiment, the computation migration rules used by the capability evaluator 201 and functional flow analysis module 203 are provided by a migration rule provider 209. The migration rules may be defined by distributed system management, service providers, or a combination thereof. One or more migration rules may be assigned to each architectural level or to every component of an architectural level. Furthermore, definition of a migration rule may take into consideration various factors affecting the migration of computations from a component or an architectural level to another component or architectural level. The migration rules may include information about devices that the computations are being migrated from and being migrated to such as device configurations, types, formats, etc. The rules can be used for mapping the computations from a start point to a destination.

In one embodiment, either of the capability evaluator 201 or the functional flow analysis module 203 may consider a combination of results from cost functions and functional flows for determining the distribution of computation closures. In this embodiment, the cost value calculator 211 processes the at least one cost function provided by the cost function provider 207, the at least one computation migration rule provided by the migration rule provider 209, or a combination thereof to determine a cost value associated with at least a portion of the distribution. In this embodiment, the closure distributor 205 may determine to whether to initiate the at least a portion of the distribution based, at least in part, on a comparison of the cost value calculated by the cost value calculator 211 against a threshold value. The threshold value may be a predefined value provided by the service provider, system management, etc. Additionally, various factors such as history data, computation characteristics and requirements, etc. may affect the threshold value.

It is noted that the capabilities determination by the capability evaluator 201 may be performed either statically, dynamically, or a combination thereof. In the case of static determination of capability, the capabilities are determined prior to computation migration and the results are stored for closure distributor 205 to refer to. In Under the static status, the computation closures may be static as well meaning that the closures may consist of pre-coded, preprocessed, pre-computed functions or functions that their availability has been previously insured. As for static closures, all the states of closure and functions are pre-computed so that a particular input will always produce the same output and the internal states remain unchanged.

Alternatively, the capability evaluator 201 may dynamically monitor the capabilities prior to and during the computation migration and whenever diagnosing an unsatisfactory condition alert the closure distribution 205. In any case, the capabilities determined by the capability evaluator 201 may not be satisfactory for computation migration; or the evaluation process may diagnose changes in the capabilities. For example, excessive work load or congestion at an architectural level or at a component of the architectural level may result in unsatisfactory status of the level or the component for computation migration. In this case, the update module 213 recalculates computational closure capabilities, and the needed level of computational closure is re-evaluated by the capability evaluator 201. In this case, the closures may be dynamic, wherein the code is constructed during the execution and furthermore, the internal state of the execution may vary. Also, the output of the computation closure execution will change based on dynamically determined capabilities.

In one embodiment, the functional flow analysis module 203 utilizes the capability determination by the capability evaluator 201 and analyzes the map of functional flow of migrating computations. The analysis results may be used for updating the functional flows. For example, an unsatisfactory capability may cause the functional flow analysis 203 search for new optimized flow maps in order to avoid or bypass the components with unsatisfactory status. The functional flow analysis module 203 may also optimize the map by suggesting redistribution of computations for resolving the congestions.

In one embodiment, the update module 213 updates information associated with the closure capability data, the one or more computation closures, one or more executable states of the one or more computation closures, the functional flow, or a combination thereof. The closure distributor 205 may process at least the update information to determine a redistribution of the one or more computation closures among the respective levels, the one or more components, or a combination thereof.

In one embodiment, the redistribution of computation closures by the closure distributor 205 may include, a least in part, start, stop, a pause, an interruption, a resumption, an interaction, a termination, a rollback, or a combination thereof of at least a portion of the one or more computation closures. For example, if the execution of computations fails, the computation distribution process would be restarted, another component selected for execution, or another computational closure (or a set of closures) with different requirements is requested.

In this embodiment, the pause, interruption, resumption, interaction, termination, or rollback may be performed in response to an unsatisfactory level of capabilities, for example to perform load balancing and optimize computation cost. For example, the closure distributor 205 may receive an alert from the capability evaluator, during distribution, stating work load congestion at one or more of the destination locations. The closure distributor 205 may in response pause the distribution until the congestion is resolved and resume the distribution, interrupt the distribution and resume the distribution to a new destination, terminate the distribution and start a redistribution process, etc.

In one embodiment, the closure capability data provided by the capability evaluator 201, the functional flow information provided by the functional flow analysis module 203, or a combination thereof is processed by the closure distributor 205, at least in part, on traversal of at least one of the one or more computation closures from a first level of the respective architectural levels to at least a second level of the respective architectural levels, from a first component of the one or more components to at least a second component of the one or more components, or a combination thereof.

In one embodiment, following the execution of the one or more distributed computations, the result aggregator 215 determines to cause, at least in part, retrieval of respective results of the computation closures based, at least in part, on the distribution and processes the results to generate an aggregated result. The aggregated result may then be stored in storage 219, sent to the device that initially requested the execution, or a combination thereof.

In one embodiment, the service class assignor 217 may determine service class information associated with at least one user of the at least one set of the one or more computation closures. The service class may assign various priority levels to the computations associated with the users, wherein the distribution, the closure capability data, the functional flow information, an availability of at least a portion of the one or more computation closures at the respective levels, or a combination thereof are based, at least in part, on the service class information.

Figure 4A:
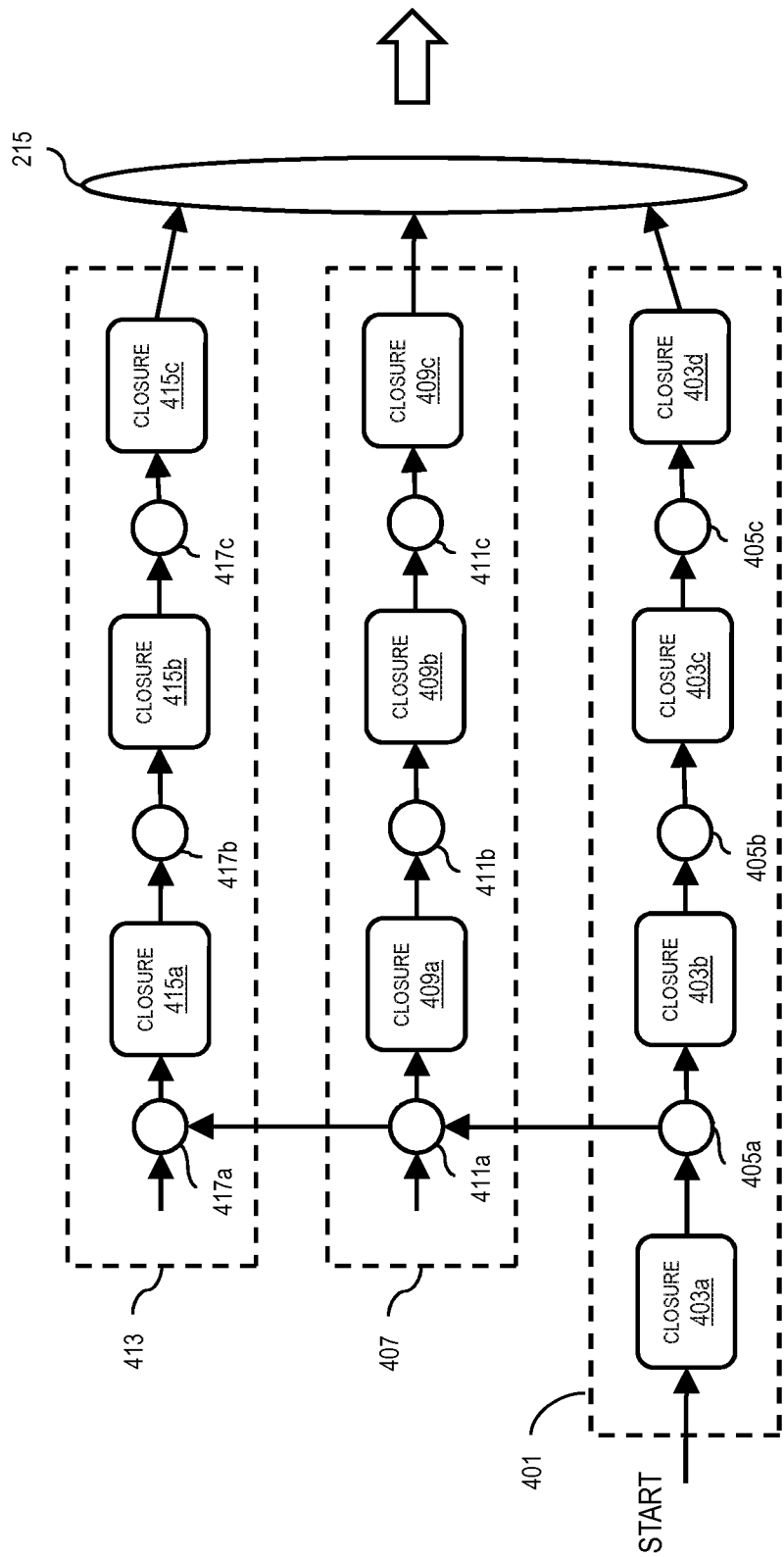
FIGS. 4A-4B are diagrams of computation distribution and load balancing in multi-level computation closure architecture, according to one embodiment.
Figure 4B:
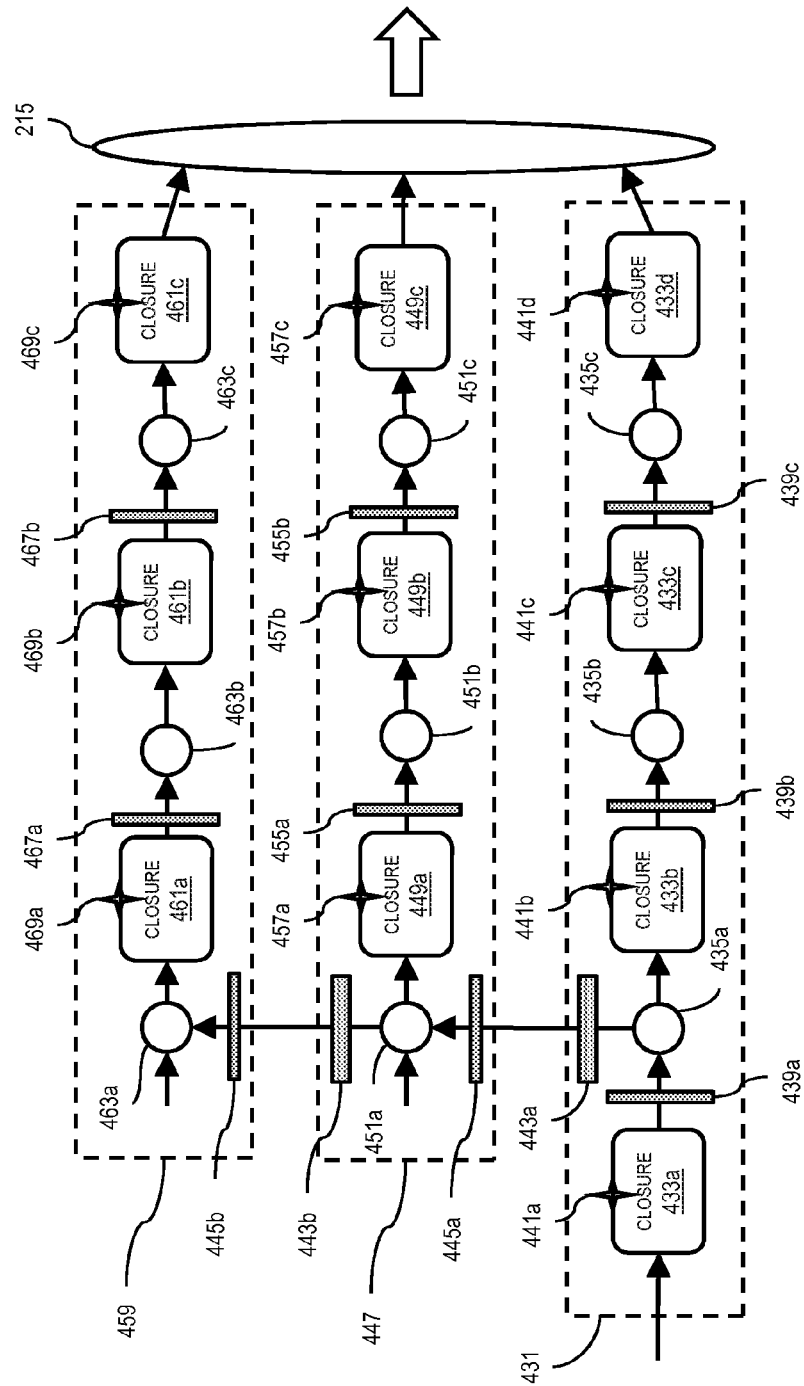

FIGS. 4A-4B are diagrams of computation distribution and load balancing in multi-level computation closure architecture, according to one embodiment. FIG. 4A is a general representation of computation distribution. As seen in FIG. 4A, the computation distribution starts at a component 401 of an architectural level (not shown). Each component may execute a set of closures that constitute a computation branch. For example, the branch 401 is composed of closures 403*a*-403*d*, wherein every two consecutive closures are connected via a connector and computational branches are communicating via connectors as well. For example, connectors 405*a*-405*c* connect closures 403*a*-403*d*. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flows, distribution maps, links between closures and architectural levels, etc. Arrows connecting closures to connectors and connectors to next closures show the functional flow adopted based on the parameters. As seen in FIG. 4A, the closures have been distributed from component 401 to component 407 via communication between connector 405*a* and connector 411*a*. The computation branch of component 407 includes closures 409*a*-409*c* communicating via connectors 411*b* and 411*c*, while branches 401 and 407 communicate via connectors 405*a* and 411*a*. Similarly, a third branch 413 has been formed of closures 415*a*-415*c* being executed at component 413 and connected by connectors 417*b* and 417*c*, while the branch communicates with other branches via connector 417*a*. The final results from closure execution of the three branches 401, 407, and 413 are aggregated by result aggregator 215 and forwarded to the requesting device.

In one embodiment, the initial branch 401 may be in a UE 107*a*-107*i*, the second branch 407 in a component of the infrastructure 117*a*-117*n*, and the third branch in another component of the same infrastructure, a different infrastructure, in a cloud, or a combination thereof.

FIG. 4B shows a computation distribution together with various parameters affecting the distribution. As seen in FIG. 4B, the computation distribution starts at a component 431 of an architectural level (not shown). Each component may execute a set of closures that constitute a computation branch. For example, the branch 431 is composed of closures 441a-441d, wherein every two consecutive closures are connected via a connector and computational branches are communicating via connectors as well. For example, connectors 435a-435c connect closures 433a-433d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flow specifications, distribution maps, links between closures and architectural levels, etc. Arrows connecting closures to connectors and connectors to next closures show the functional flow adopted based on the parameters. For example, star signs 441a-441d, 457a-457c, and 469a-469c represent the capability parameters provided by the capability evaluator 201 and associated with each closure 433a-433d, 449a-449c, and 461a-461c respectively. Additionally, blocks 439a-439c, 455a-455b, 467a-467b, and 443a-443b represent cost values provided for one or more closures by the cost function provider 207 and cost value calculator 211. In the example of FIG. 4B, the cost value 439a shows the cost for binding closure 433b to closure 433a and directs closure 433b to branch 431, via connector 435a, as the next closure to be executed after closure 433a. In one embodiment, if the value of certain parameters, such as cost, based on the analyses by the capability evaluator 201 and the functional flow analysis module 203 exceed a certain thresholds, some computational closure may be omitted from the chain in the current branch, for the value to be reduced. The closures may be initially assigned with priority levels, so that less important closures can be omitted if necessary. Similarly, cost values 439b and 439c direct closures 433c and 433d in branch 431 via connectors 437b and 437c. In a higher level of hierarchy, the cost value 445a directs closures 449a-449c to component 447 and similarly the cost value 445b directs closures 461a-461c to component 459. Additionally in branch 447, connectors 451a-451c and cost values 455a and 455b direct closures 449a-449c down the path of branch 447. Similarly, in branch 459, connectors 463a-463c and cost values 467a and 467b direct closures 461a-461c down the path of branch 459. The final results from closure execution of the three branches 431, 447, and 459 are aggregated by result aggregator 215 and forwarded to the requesting device.

Figure 5:
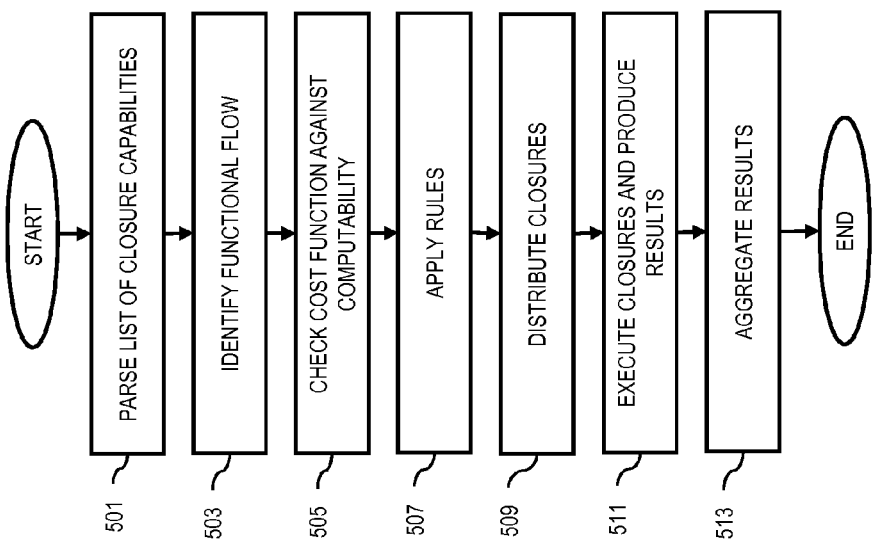
FIG. 5 is a flowchart of load balancing process, according to one embodiment.
Figure 14:
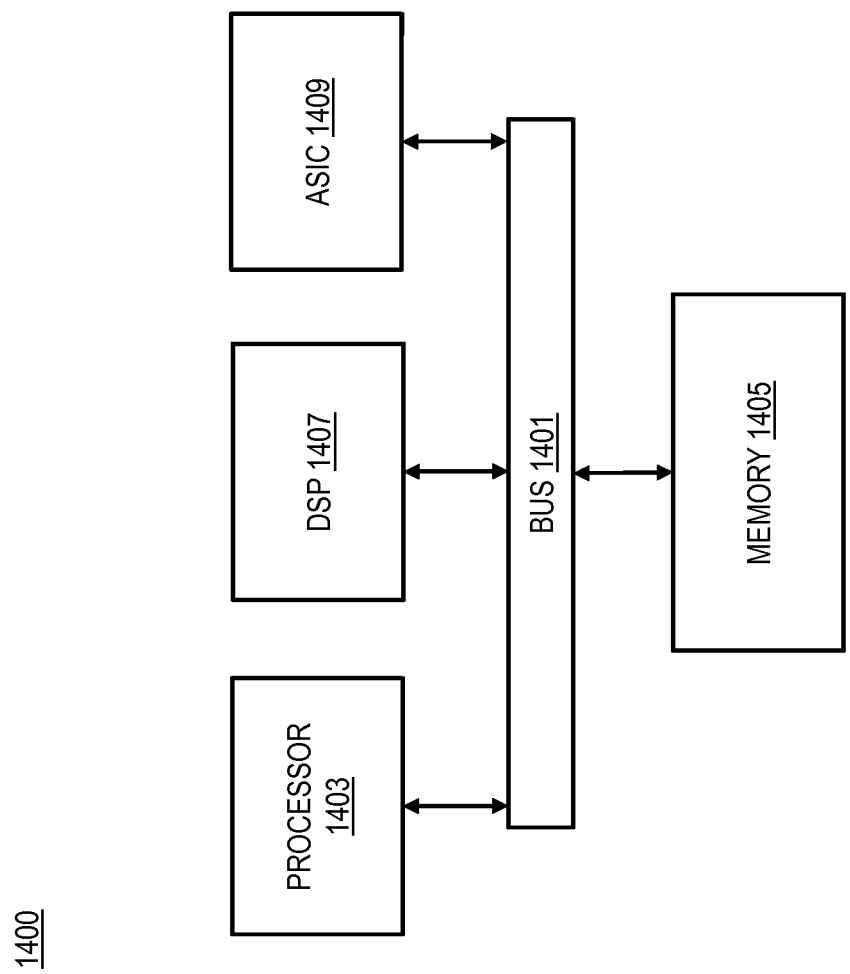
FIG. 14 is a diagram of a chip set that can be used to implement an embodiment of the invention.

FIG. 5 is a flowchart of load balancing process, according to one embodiment. In one embodiment, the distributed computation control platform 103 performs the process 500 and is implemented in, for instance, a chip set including a processor and a memory as shown in FIG. 14.

In one embodiment, the amount of work load describes the requirements for load balancing. The user of a UE 107 is able to decide how different computational closure levels are projected. For example, how different load levels should be handled, what components should be used, what restrictions to selected components are applied, what is the service class (priority level) of each computation, etc.

In one embodiment, the distributed computation control platform 103 is aware of work load at each level of the network, for example between UEs in device level, between components in infrastructure level, between clouds in cloud level, between infrastructures, between cloud groups, and between different levels of architecture. Additionally, the distributed computation control platform 103 is capable of utilizing computational resources and take additional resources (e.g., computational branches) when necessary. For example, the distributed computation control platform 103 may offload a process from one cloud to another cloud via the infrastructure level. The distributed computation control platform 103 may also create and take into account load balancing parameters such as computational capabilities (by the capability evaluator 201) for each entity, functional flow setup (by the functional flow analysis module 203) for any number of computational elements, load balancing rules affecting the setup (provided by migration rule provider 209), etc.

Furthermore, the distributed computation control platform 103 may start load balancing process through which the executable states can be transferred to next computational branch as seen in FIGS. 4A and 4B. In one embodiment, the distributed computation control platform 103 may apply various operations such as start, stop, pause, resume, or more complex operations such as interact, interrupt, roll back, etc. on load balancing process to optimize the cost of computation provided by the cost value calculator 211 based on cost functions provided by the cost function provider 207.

In one embodiment, the closure distributor 205 utilizes the parameters such as, capabilities 441a-441d, 457a-457c, and 469a-469c, functional flow map (shown by arrows in FIG. 4A or 4B); cost values 439a-439c, 455a-455b, 467a-467b, and 443a-443b, rules 445a and 445b, etc. to perform load balancing during the closure distribution. As seen in FIG. 5, in step 501 the closure distributor 205 parses a list of closure capabilities provided by capability evaluator 201. This list shows which closures can be executed at which architectural level of the computational environment (e.g. device level, infrastructure level, or cloud level). Per step 503 the functional flow of closures is identified by the functional flow analysis module 203, based on the parameters such as capabilities. The functional flow analysis determines, at every step of load balancing, what will be the next computational component. Per step 505 the capability evaluator 201 receives cost values from the cost value calculator 211 and compares the cost values against the parsed list of closure capabilities in order to select the most cost efficient next component capable of the current computations. Per step 507 the capability evaluator 201 and the functional flow analysis module 203 apply the rules provided by the migration rule provider 209 on the current computations and choices for the next computation component. The rules may eliminate some of the components that for example, are not approved for having access to the computation, for example for privacy or security reasons. Per step 509 the closure distributor 205 distributes the current computations to the selected components. It is noted that the computations may be distributed from a UE 107 to many components of an infrastructure level 117a, for a UE 107 to many components of multiple infrastructure levels 117a-117k, from many components of multiple infrastructures to multiple clouds, or a combination thereof.

Per step 511 the receiving devices, components, clouds execute the distributed computation closures and produce execution results. The execution happens in many branches such as 431, 447, or 459 of FIG. 4B, where one branch may be in the UE 107 (e.g. branch 431), while other branches can be distributed over many components, where each component may execute a sub-branch. Each component may store the execution results locally, send the results to a collection point via the links to other components, or a combination thereof. In step 513 the result aggregator 215, aggregates the results from distributed computations and produces the result of the overall process made of the distributed computations. The result may be stored locally in storage 219, sent directly to the requesting UE 107, sent to one or more components of infrastructures or clouds with connectivity to the requesting UE 107 to be made accessible to the UE, or a combination thereof.

Figure 6:
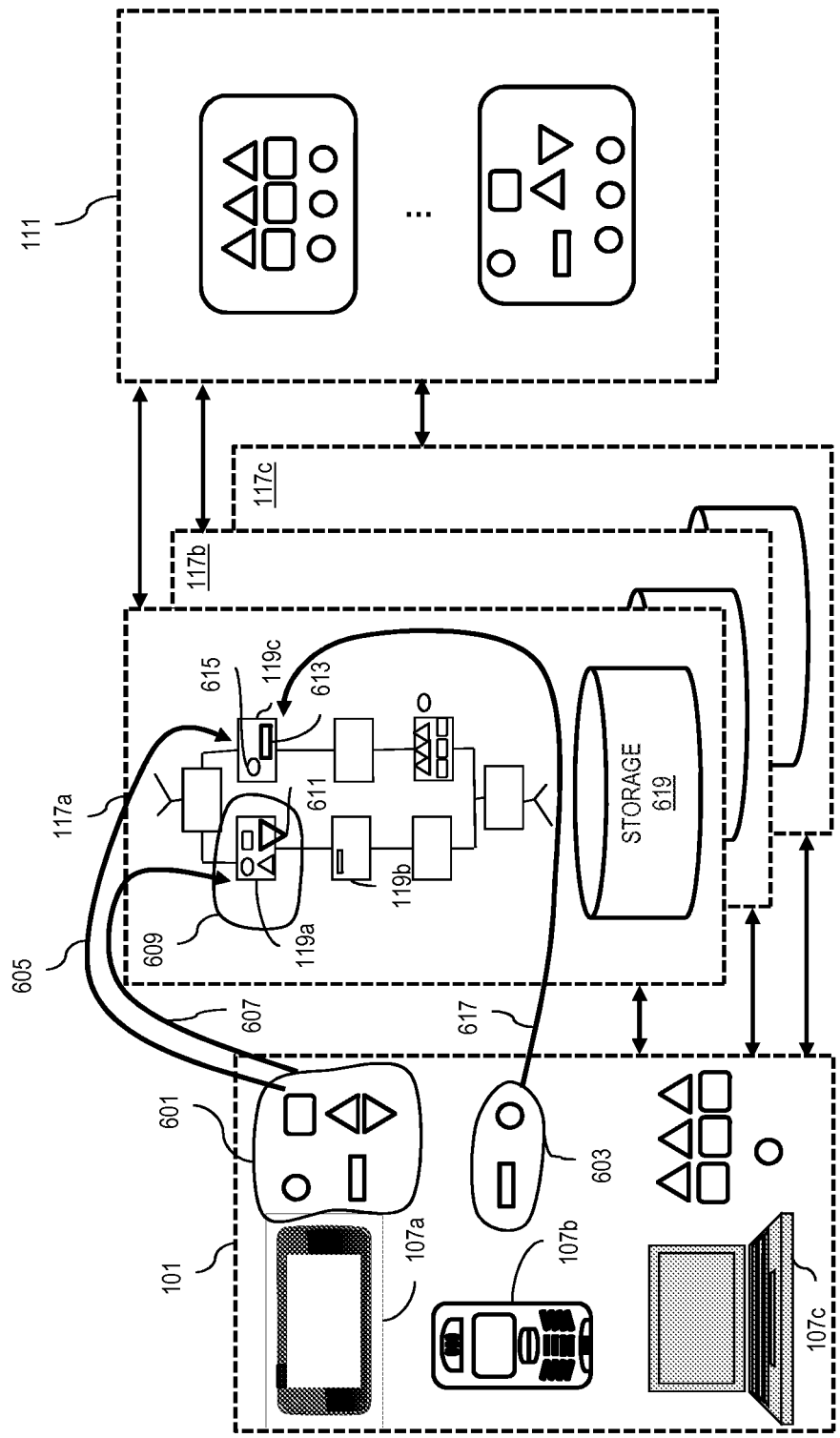
FIG. 6 is a diagram of multi-level computation closure load balancing architecture, according to one embodiment.

FIG. 6 is a diagram of multi-level computation closure load balancing architecture, according to one embodiment. In one embodiment, the set 101 comprises UEs 107a, 107b, and 107c, wherein UE 107a needs set 601 and UE 107b needs set 603 of computation closures to be migrated and executed by the next level of architecture, infrastructure 117a. The distributed computation control platform 103 receives a request from UE 107a for migration of set 601. The compatibility evaluator 201 and functional flow analysis module 203 use various parameters such as cost value from cost value calculator 211, rules from migration rule provider 209, service class for UE 107 from service class assignor 217, etc., and select components 119a and 119c from infrastructure 117a as a match for migration. In this example, component 119a includes three of the five closures from set 601, but has capability for execution of four of the five closures from set 601. Therefore, the closure distributor 205 migrates the fourth closure 611 to the component 119a (shown by arrow 607) and the fifth closure 613 to component 199c (shown by arrow 605). Once the execution is completed, the results of execution of set 609 are aggregated with the result from execution of closure 613, by the result aggregator 215 . . . . In the case of UE 107b and set 603 of computation closures, the compatibility evaluator 201 and functional flow analysis module 203 may select component 119c for migrating process 603. In this example, set 603 can be mapped on computation closures 613 and 615 (shown by arrow 617). This means that closures 613 and 615 can be executed to produce results for closure set 603. The execution results may be stored in storage 619 for further process.

In one embodiment, distributed computation control platform 103 may be informed about capabilities found in infrastructure components or clouds via the capability evaluator 201. The distributed computation control platform 103 may periodically receive updated information about available capabilities and updated parameters from the infrastructures or clouds and the capability evaluator 201 and the functional flow analysis module 203 modify the capabilities and functional flows.

As previously discussed, the capabilities of either point of the migration (e.g. UE 107a or component 119a) may change. For example, a component 119a may lose its power supply, the UE 107a may be plugged to main power supply instead of being operated by a battery, etc. In such cases, the update module 213 determines the change and adjusts the parameters accordingly.

Figure 7A:
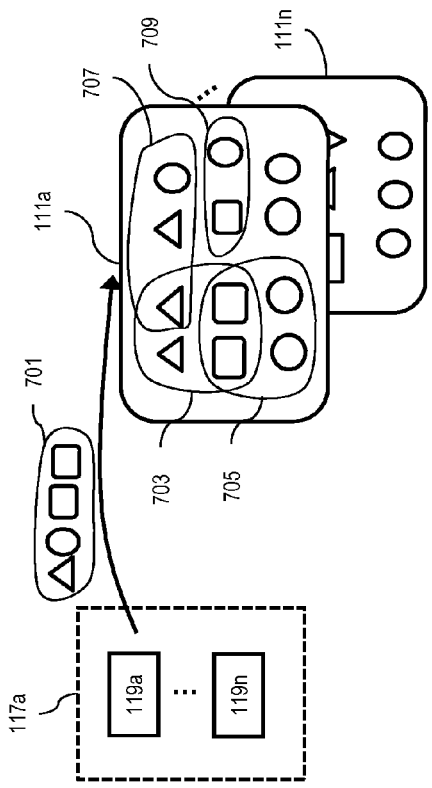
FIGS. 7A-7B are diagrams of offloading computations, according to various embodiments.
Figure 7B:
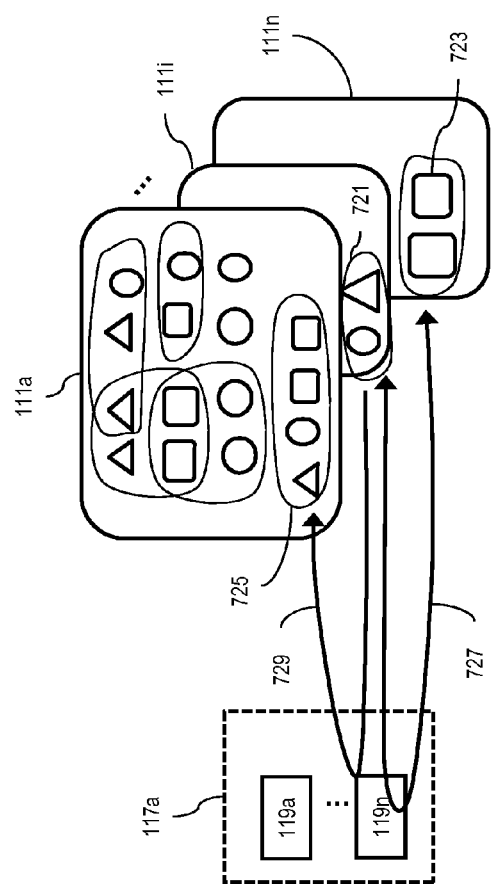

FIGS. 7A-7B are diagrams of offloading computations, according to various embodiments. FIG. 7A shows communication among an infrastructure 117a with multiple clouds 111a-111n. In FIG. 7A closure set 701 is migrated from infrastructure 117a to clouds 111a-111n. In one embodiment, closure sets in a cloud may overlap. As seen in FIG. 7A, the closure sets 703, 705, and 707, in a cloud 111a, overlap with each other. A cloud 111a may serially pre-execute closures within cloud 111a, or between clouds 111a-111n. FIG. 7B shows the offloading of capabilities between clouds 111a-111n. In FIG. 7B, closure set 723 is offloaded from cloud 111n to cloud 111i via the infrastructure 117a (shown by arrow 727). Following the offloading of closure set 723 to cloud 111i (not shown), if the distributed computation control platform 103 recognizes that the total load balance is not yet achieved, the closures may be further offloaded to other clouds. As seen in FIG. 7B the closure set 725 consists of the combination of closure sets 721 and 723 and is offloaded from cloud 111i to cloud 111a as showed by arrow 729. In cloud 111a, the closure sets 723 and 721 are aggregated to produce closure set 725 which is equivalent of the initial set 701 in FIG. 7A. If the array of offloading lead to the achievement of load balancing goal (for example based on a predefined threshold) the closure set 725 is executed in cloud 111a and the execution results are returned to infrastructure 117a after being aggregated by the result aggregator 215.

Figure 8:
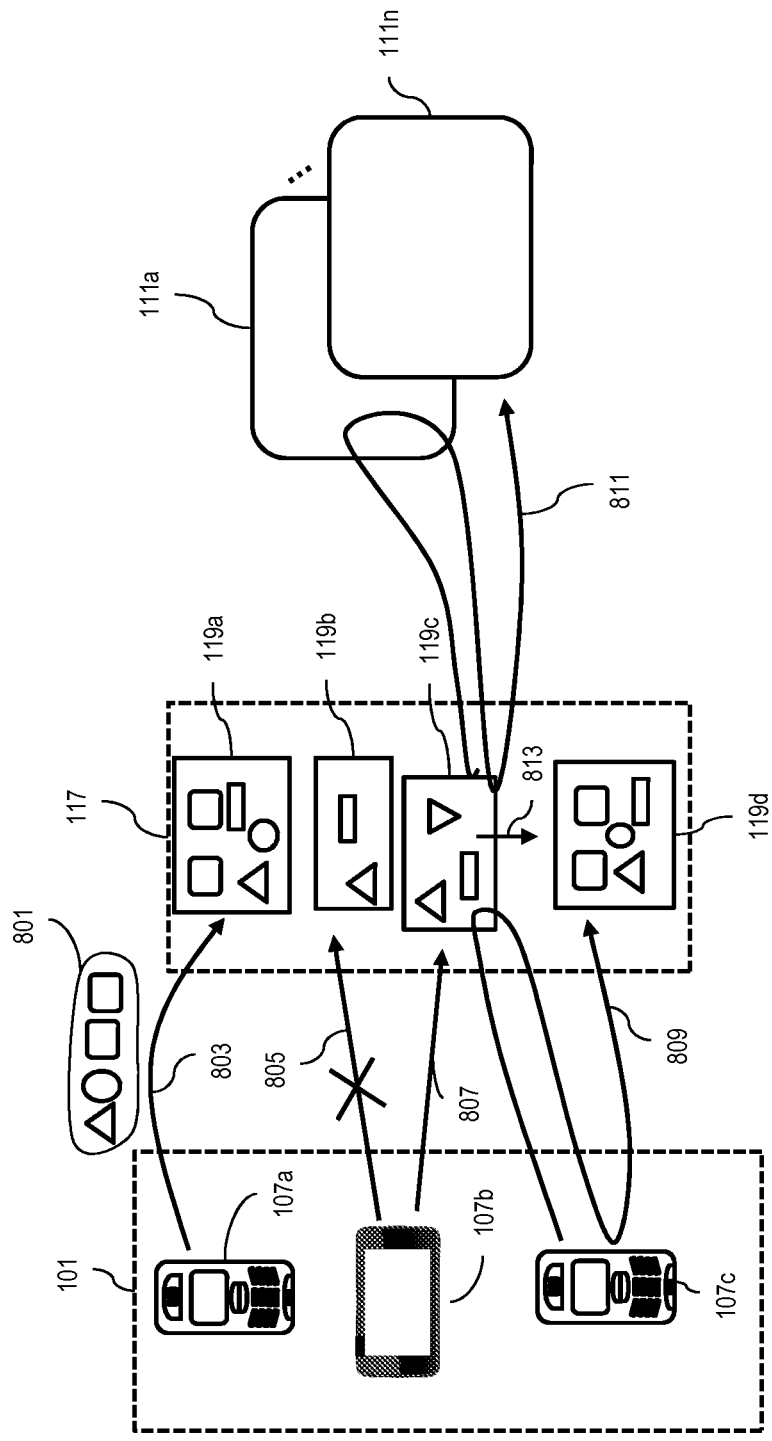
FIG. 8 is a diagram of dynamic processing of distributed computation, according to one embodiment.

FIG. 8 is a diagram of dynamic processing of distributed computation, according to one embodiment. In one embodiment, the closure set 801 from UE 101a is being sent to infrastructure 117, shown as arrow 803, by the distributed computation control platform 103 and the component 119a from infrastructure 117 starts execution of closure set 801. In another embodiment, UE 107b may communicate closures to component 119b of infrastructure 117 (shown as arrow 805), but component 119b may fail to execute the closures. In this case the distributed computation control platform 103 stops the execution process and selects another component (e.g. component 119c) and the execution will resume at component 119c (arrow 807). Meanwhile, other closures may be requested to be executed on component 119a. In one embodiment, the direction of load balancing may be top-down starting at the cloud level, continuing at infrastructure level and ending at device level. For example, the starting point for a service setup may be from cloud side, wherein cloud services can be segmented and processed at the infrastructure level or device level. For example cloud 111a may request from infrastructure 117, via arrow 811, to evaluate computational closure capabilities for another cloud (111). Alternatively, the infrastructure component 119c may reroute computational closure reservations to another component 119d (shown by arrow 813) within the infrastructure, or the component 119c may reroute the closures to device 107c and device 107c reroute the closures to another component 119d of the infrastructure 117 (shown as arrow 809) or a component from another infrastructure (not shown).

Figure 9A:
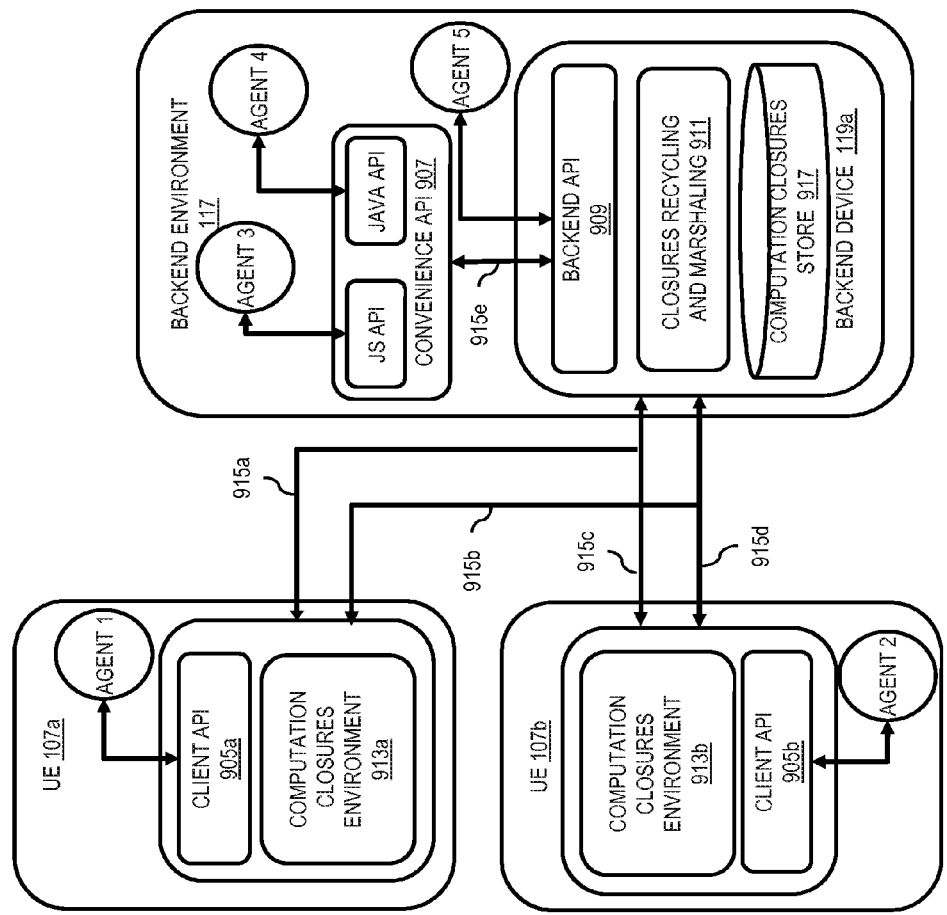
FIGS. 9A-9B are diagrams of computation migration among devices, according to one embodiment.
Figure 9B:
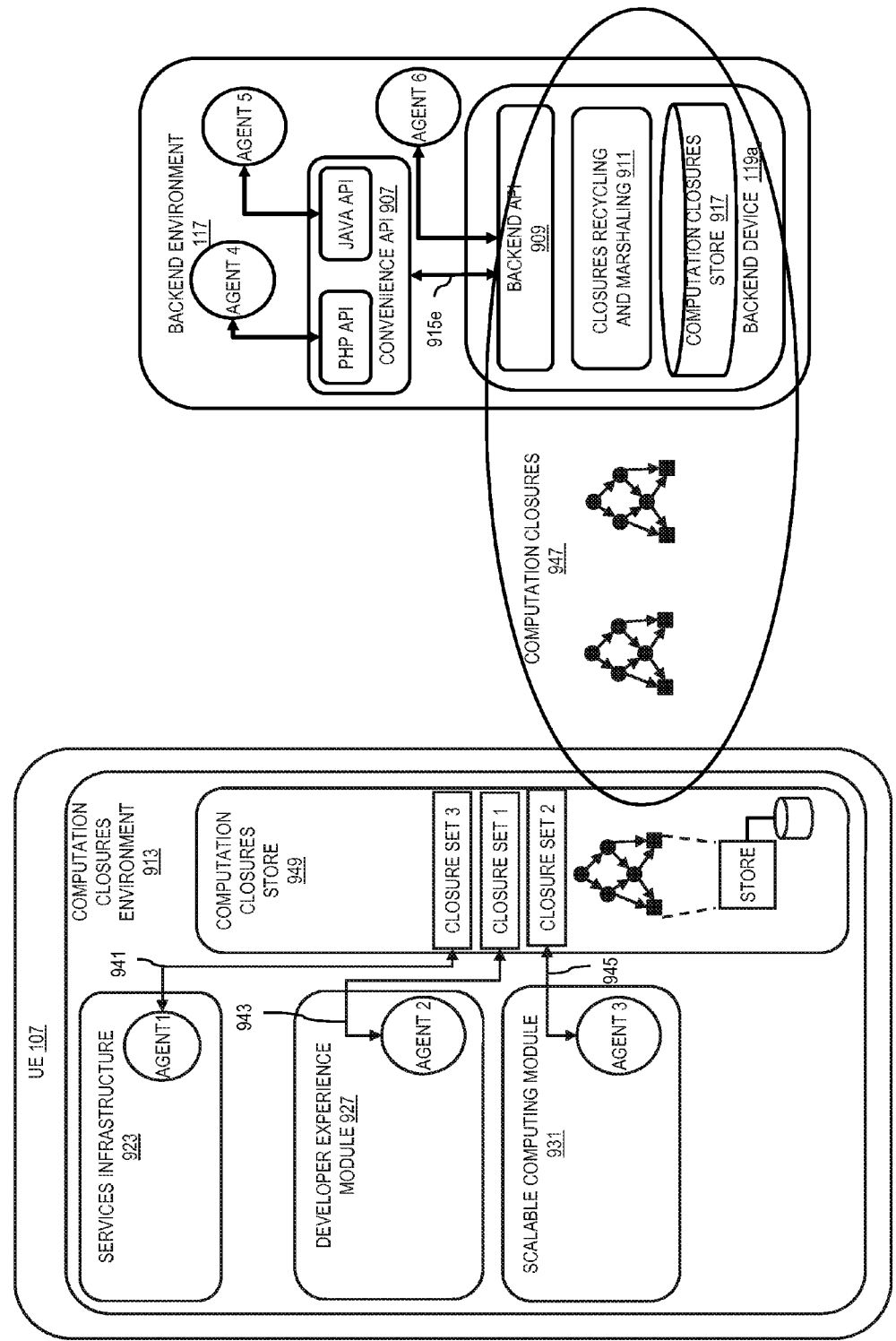

FIGS. 9A-9B are diagrams of computation migration among devices, according to one embodiment. In one embodiment, in FIG. 9A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 907 that may include APIs tailored to the software development environments used (e.g. JAVA, PHP, etc.). Furthermore, UEs 107a and 107b may include client APIs 905a and 905b. Each API enables interaction between devices and components within another device or an environment. For example, backend API 909 enables interaction between the backend device 119a and Agent5, and convenience API 907 enables interaction between the backend device 119a and agents Agent3 and Agent4, wherein each agent is a set of processes that handle computation closures within the backend environment 117. APIs 905a and 905b enable interaction between UE 107a and agent Agent1, and UE 107b and agent Agent2 respectively. As seen in the example of FIG. 9A, Agent3 works under PHP while Agent4 is a JAVA process. Each of the UEs 107a and 107b has a computation closure environment 913*a* and 913*b* which may be part of a cloud 111. Arrows 915*a*-915*e* represent migration path of computation closures among the environments 913*a*, 913*b* and the computation closure store 917. The computation closures store 917 is a repository of computation closures that can be accessed and used by all the UEs and infrastructure components having connectivity to the backend environment 117.

In one embodiment, the backend device 119*a* may be equipped with a closure recycling and marshaling component 911 that monitors and manages any access to the computation closure store 917. In other embodiments the closure recycling and marshaling (i.e. standardization for uniform use) may be a function of the distributed computation control platform 103.

In one embodiment, the computation closures within environments 913*a*, 913*b* and the computation closures store 917 may be composed based on anonymous function objects and automatically created by a compiling system using methods for generating anonymous function objects such as lambda expressions.

FIG. 9B is an expanded view of a computation closure environment 913 as introduced in FIG. 9A. The computation closure environment 913 may be composed of one or more computation closure generating components. In one embodiment the computation closure environment 913 has a services infrastructure 923 that provides various services for the user of the UE 107. The services may include any application that can be performed on the UE 107 such as, games, music, text messaging, voice calls, etc. In one embodiment, the service infrastructure 923 provides support for closure migration under the supervision of a distributed computation control platform 103 as discussed in FIG. 1 and FIG. 2. The agent Agent1 retrieves the computation closures required by the services infrastructure 923 from the computation closures store 949 and stores the newly generated computation closures by the services infrastructure 923 into the computation closures store 949 for migration purposes per arrow 941.

In another embodiment, the computation closure environment 913 has a developer experience module 927 that provides various tools for a developer for manipulating services offered by the UE 107. The tools may include standardized and/or abstract data types and services allowing the developers to chain processes together across development platforms. In one embodiment, the developer experience module 927 provides cross platform support for abstract data types and services under the supervision of a distributed computation control platform 103 as discussed in FIG. 1. The agent Agent2 retrieves the computation closures required by the developer experience module 927 from the computation closures store 949 and stores the newly generated computation closures by the developer experience module 927 into the computation closures store 949 for migration purposes per arrow 943.

In yet another embodiment, the computation closure environment 913 has a scalable computing module 931 that provides an abstract wrapper (i.e. monadic wrapper) for the migrating closures 601. This abstraction provides computation compatibility between the closures 601 and the UE 107. The abstract wrapper may provide scheduling, memory management, system calls and other services for various processes associated with the closures 601. These services are provided under the supervision of the distributed computation control platform 103 as discussed in FIG. 1. The agent Agent3 retrieves the computation closures required by the scalable computing module 931 from the computation closures store 949 and stores the newly generated computation closures by the scalable computing module 931 into the computation closures store 949 for migration purposes per arrow 945. In one embodiment, the backend environment 117 may access the computation closure store 949 and exchange/migrate one or more computer closures 947 between the computation closures store 949 and the backend computation closures store 917.

Figure 10:
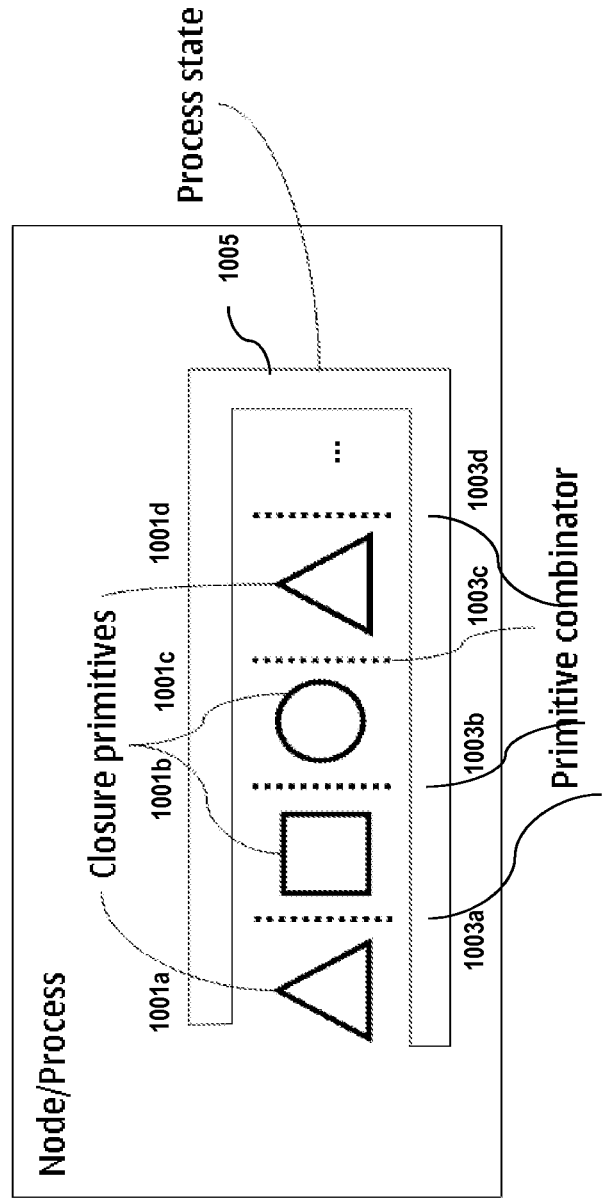
FIG. 10 is a diagram showing a process as a combination of primitive computation closures, according to one embodiment.

FIG. 10 is a diagram showing a process as a combination of primitive computation closures, according to one embodiment. Process 1000 consists of closure primitives 1001*a*-1001*d*. The closure primitives 1001*a*-1001*d*, which are similar to closures 611, 613 and 615 in FIG. 6, are combined with each other into process 1000 by combinators 1003*a*-1003*d*. The object 1005 represents the execution requirements including process states under which the execution of closures 1001*a*-1001*d* combined by combinators 1003*a*-1003*d* will result in the process 1000.

In one embodiment, migration of process 1000 by the closure distributor 205 of the distributed computation control platform 103 includes migration of closures 1001*a*-1001*d*, combinators 1003*a*-1003*d* and the process states 1005 as independent elements into, for instance, an infrastructure environment 117. The independent closures 1001*a*-1001*d* from infrastructure environment 117 may be distributed into different components 119*a*-119*m* where they may be executed.

Figure 11:
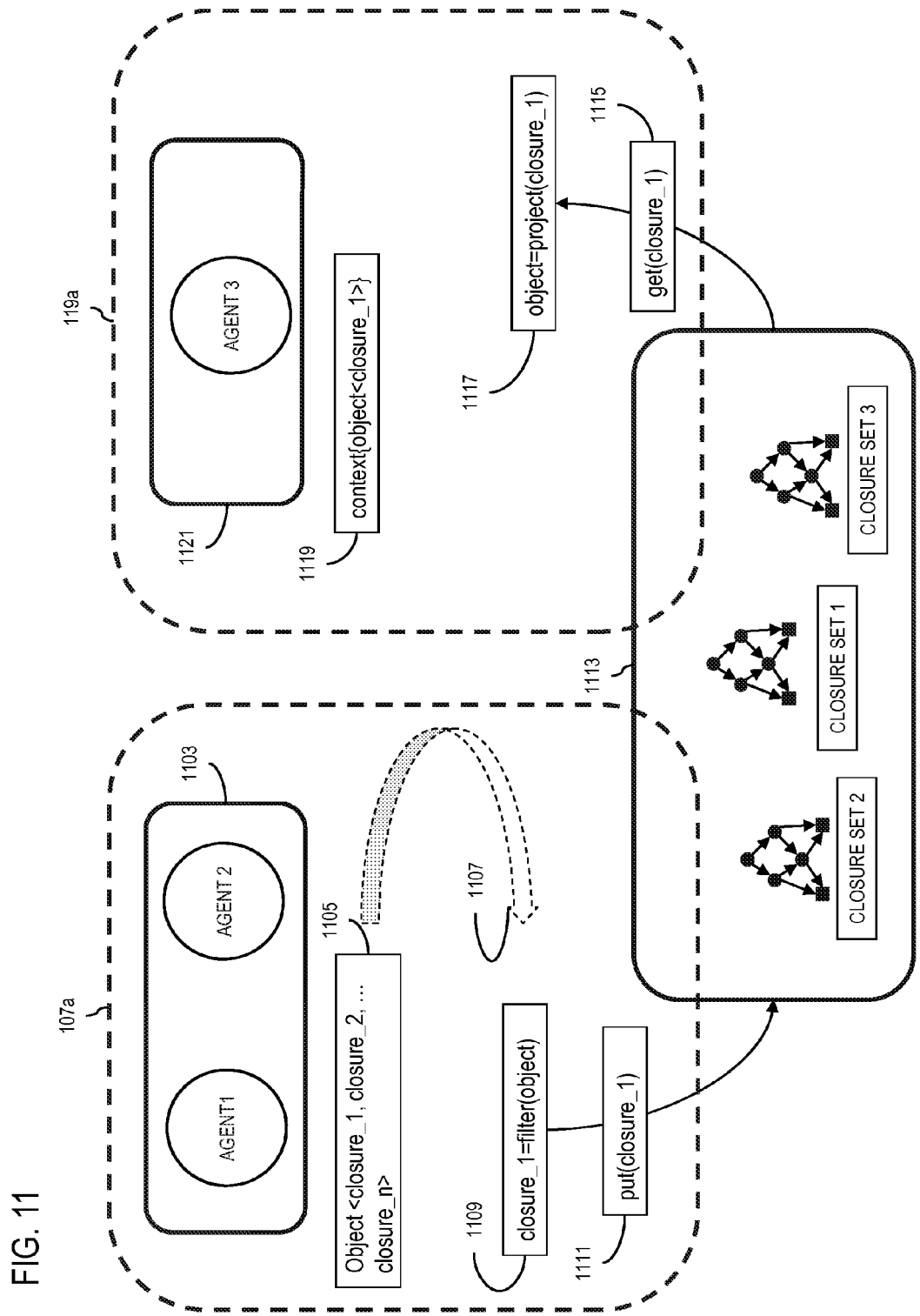
FIG. 11 is a diagram of process migration from a device to another device, according to one embodiment.

FIG. 11 is a diagram of process migration from a device to another device, according to one embodiment. In one embodiment, the device 107*a* is a UE associated with the user. The UE 107*a* may include a user context 1103 which is being migrated among devices. Agent1 and agent2 are processors that calculate and handle computation closures within the user context 1103. The number of agents may be different in different devices based on their design, functionality, processing power, etc. Block 1105 represents an Object as a set of computation closures, closure_1, closure_2, . . . , and closure_n, where each closure is a component of a larger process, for example, related to a service provided to the user by the user equipment 107*a*. Each closure is a standalone process that can be executed independently from the other closures. In the example of FIG. 11, the filtering process 1107 extracts closure_1 from the closure set Object via filtering the set (shown in block 1109). The extracted closure_1 is added to a computation closure store 1113 using the exemplary Put command 1111.

It is assumed, in this example, that component 119*a* of an infrastructure level (not shown) is selected by the distributed computation control platform 103 as a destination for closure migration from UE 107*a*. The extracted computation closure, closure_1 is migrated to component 119*a* by the closure distributor 205 and executed on component 119*a*.

In one embodiment, the component 119*a* receives the computation closure closure_1 and extracts it from the computation closure store 1113 using the Get command 1115. The extracted closure_1 is projected into a closure with the user device context and the object 1117 is produced. The block 1119 represents the reconstruction of the closure into the initial context by a component in charge of the execution. The aggregated context may then be executed in the run-time environment 1121 of component 119*a* by Agent3.

In another embodiment, the UE 107*a* and component 119*a* may exchange places and the migration is performed from the component 119*a* to UE 107*a* or both devices may be UEs. In this embodiment the decomposition and aggregation processes are similar to the above example.

Figure 12:
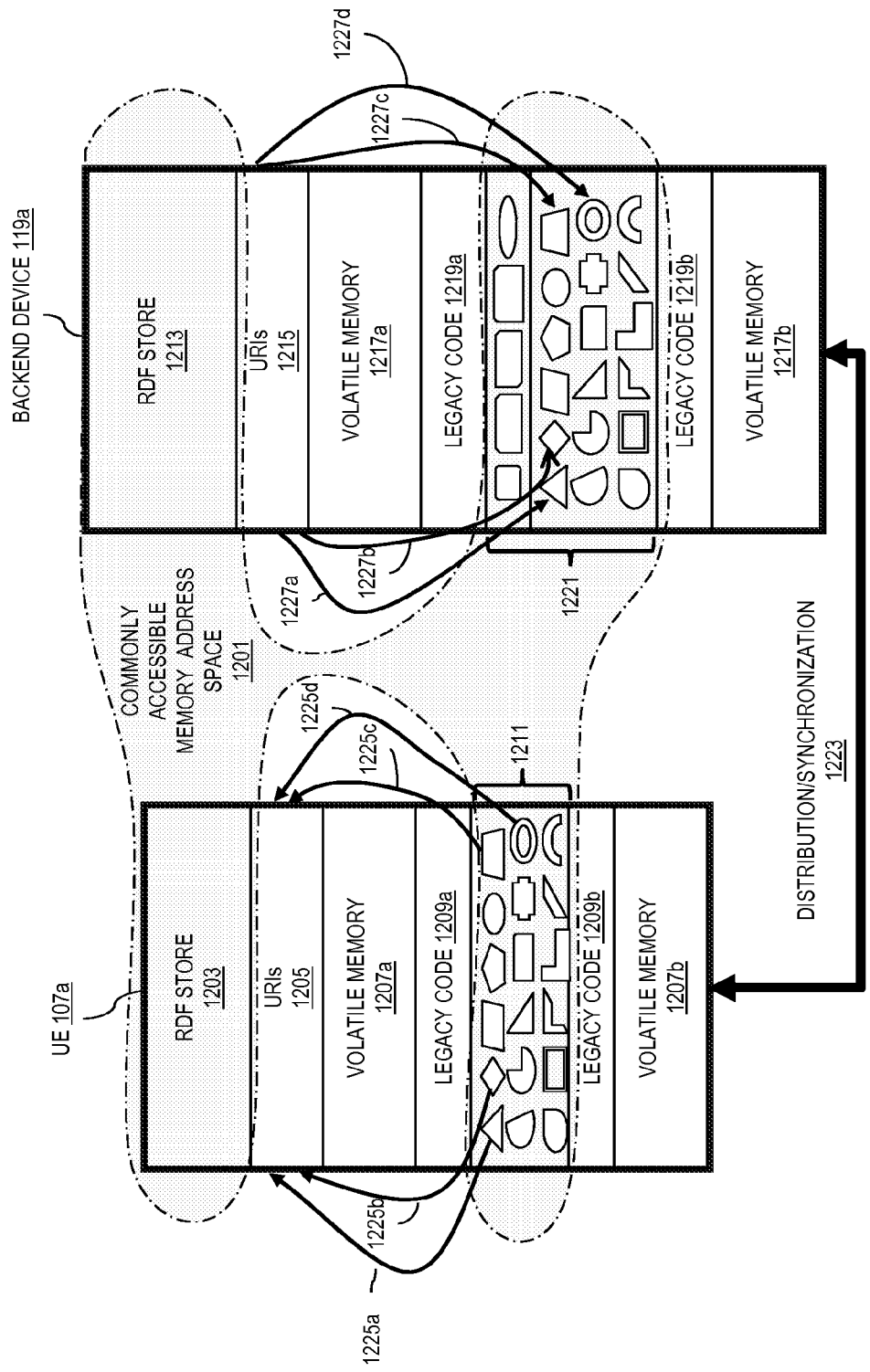
FIG. 12 is a diagram of computation closure allocation/mapping, according to one embodiment.

FIG. 12 is a diagram of computation closure allocation/mapping, according to one embodiment. The diagram of FIG. 12 shows a commonly accessible memory address space 1201 formed between a UE 107a as a client and the backend device 119a as a component of a computation infrastructure 117.

In one embodiment, the UE 107a may include RDF store 1203, which holds computation closures for processes associated with the UE 107a. Similarly the backend device 119a may includes a RDF store 1213, which holds computation closures associated with processes related to device 119a, UEs 107a-107i, or any other devices having connectivity to device 119a or cloud 111.

In other embodiments, the Uniform Resource Identifiers (URIs) 1205 in UE 107a and 1215 in backend device 119a may be used to identify names or resources accessible to their respective devices via the communication network 105. Furthermore, the legacy codes associated with each device may be stored in legacy code memory areas 1209a and 1209b on UE 107a and 1219a and 1219b on backend device 119a.

In one embodiment, UE 107a may be provided with a non-volatile memory space 1211 as a closure store. The closure store 1211 may include a set of closure primitives shown as geometric objects, similar to primitives of sets 601 or 603 of FIG. 6 or 703-709 of FIG. 7. Similarly, the backend device 119a may be provided with a non-volatile memory space 1221 as a closure store. The closure store 1221 may also include a set of closure primitives shown as geometric objects. In one embodiment, the closure store 1211 is a subset of closure store 1221 determined, at least in part, based on one or more criteria such as time of access, frequency of access, a priority classification, etc. Since non-volatile memories are costly and require extensive resources (e.g. power consumption) compared with volatile memories (such as 1207a, 1207b, 1217a, and 1217b), the capacity of non-volatile memory on a UE 107a-107i is limited. However, a backend device 119a, serving high numbers of users, may be equipped with larger volumes of non-volatile memory spaces. Because of the limited capacity of non-volatile memory spaces on UEs 107a-107i, a subset of the closure store 1221 is stored locally at the closure store 1211 for local use by the UE 107a. In order to minimize the number of times a UE 107 needs to retrieve one or more primitives from closure store 1221 of device 119a, the subset 1211 is determined based on one or more criteria. In one embodiment, the closure store 1211 may be determined as a set of the most frequently accessed closure primitives of closure store 1221 by UE 107a. In another embodiment, the closure store 1211 may be determined as a set of the most recently accessed closure primitives of closure store 1221 by UE 107a. In other embodiments, various combined conditions and criteria may be used for determining subset 1211 from set 1221 as the content of closure store for UE 107a. Furthermore, the closure stores 1211 and 1221 may be periodically synchronized. The synchronization of closure stores ensures that any changes (addition, deletion, modification, etc.) in closure primitives of closure store 1221 are reflected in the closure store 1211.

In one embodiment, for execution of a closure set 601 (a subset of closure store 1211) associated with a process on UE 107a, the set 601 can be migrated by the closure distributor 205 of the distributed computation control platform 103 to the backend device 119a which is a component of the infrastructure 117 (the migration path shown as arrow 1223). The distributed computation control platform 103 may then inform the processing components of the UE 107a, the backend device 119a or a combination thereof (the processing components are not shown), that the closure primitives are ready for execution.

In one embodiment, any changes on the closure store 1221 of the backend device 119a (e.g., addition, deletion, modification, etc.) may first enter the URIs 1215 via the communication network 105. The changes may then be applied from URIs 1215 on closure store 1221 shown by arrows 1227a-1227d. Similarly, the closure store 1211 is updated based on the content of the closure store 1221 and the updates are shared with other components within UE 107a (e.g. with URIs 1205 as shown by arrows 1225a-1225d).

In one embodiment, the commonly accessible memory address space 1201 is formed from the RDF stores 1203 and 1213 and the closure stores 1211 and 1221. The commonly accessible memory address space 1201 can be accessed as a continuous memory space by each of the devices 107a and 119a.

The processes described herein for providing load balancing in multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
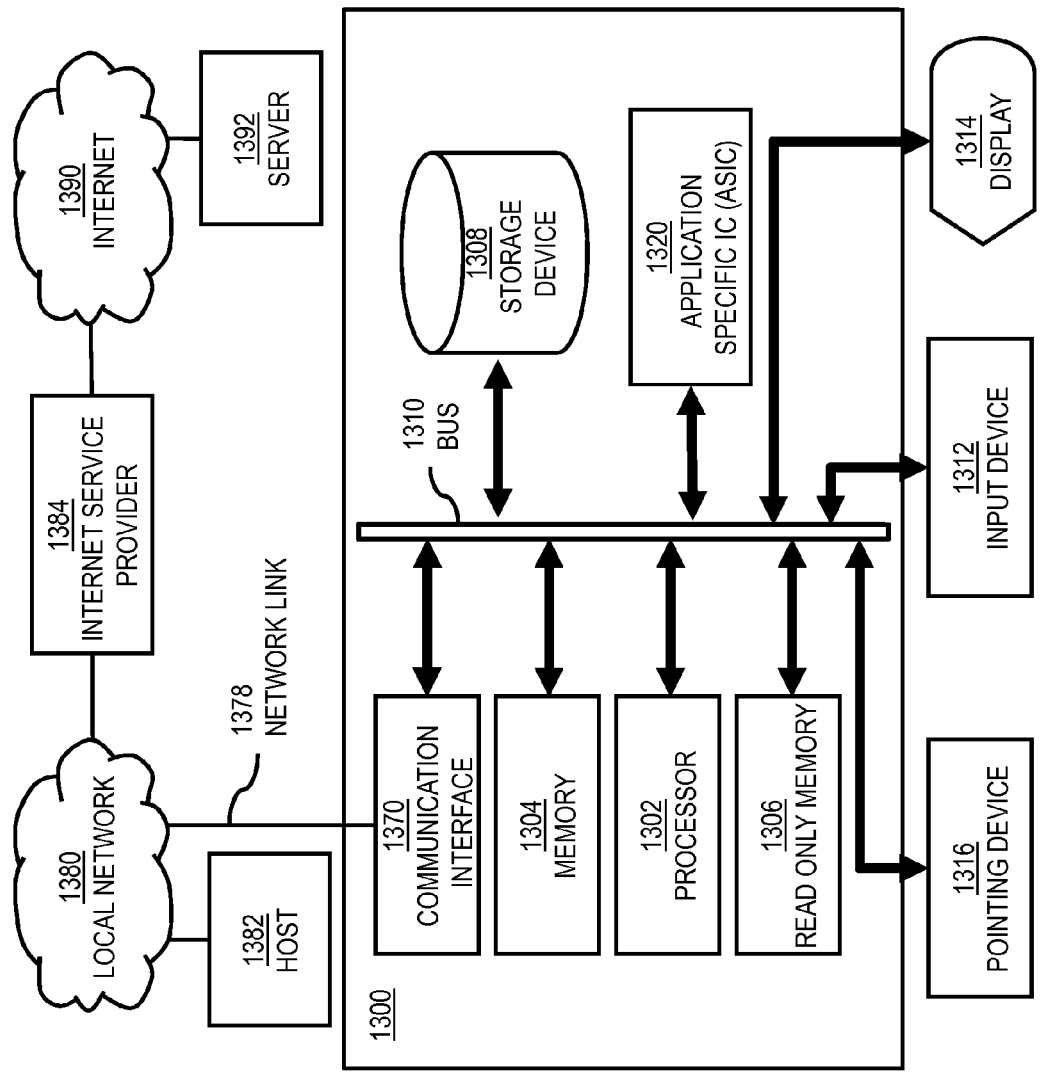
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to provide load balancing in multi-level distributed computations as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of providing load balancing in multi-level distributed computations.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to providing load balancing in multi-level distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or any other dynamic storage device, stores information including processor instructions for providing load balancing in multi-level distributed computations. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing load balancing in multi-level distributed computations, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for providing load balancing in multi-level distributed computations to the UEs 107*a*-107*i*.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to provide load balancing in multi-level distributed computations as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of providing load balancing in multi-level distributed computations.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide load balancing in multi-level distributed computations. The memory 1405 also stores the data associated with or generated by the execution of the inventive steps.

Figure 15:
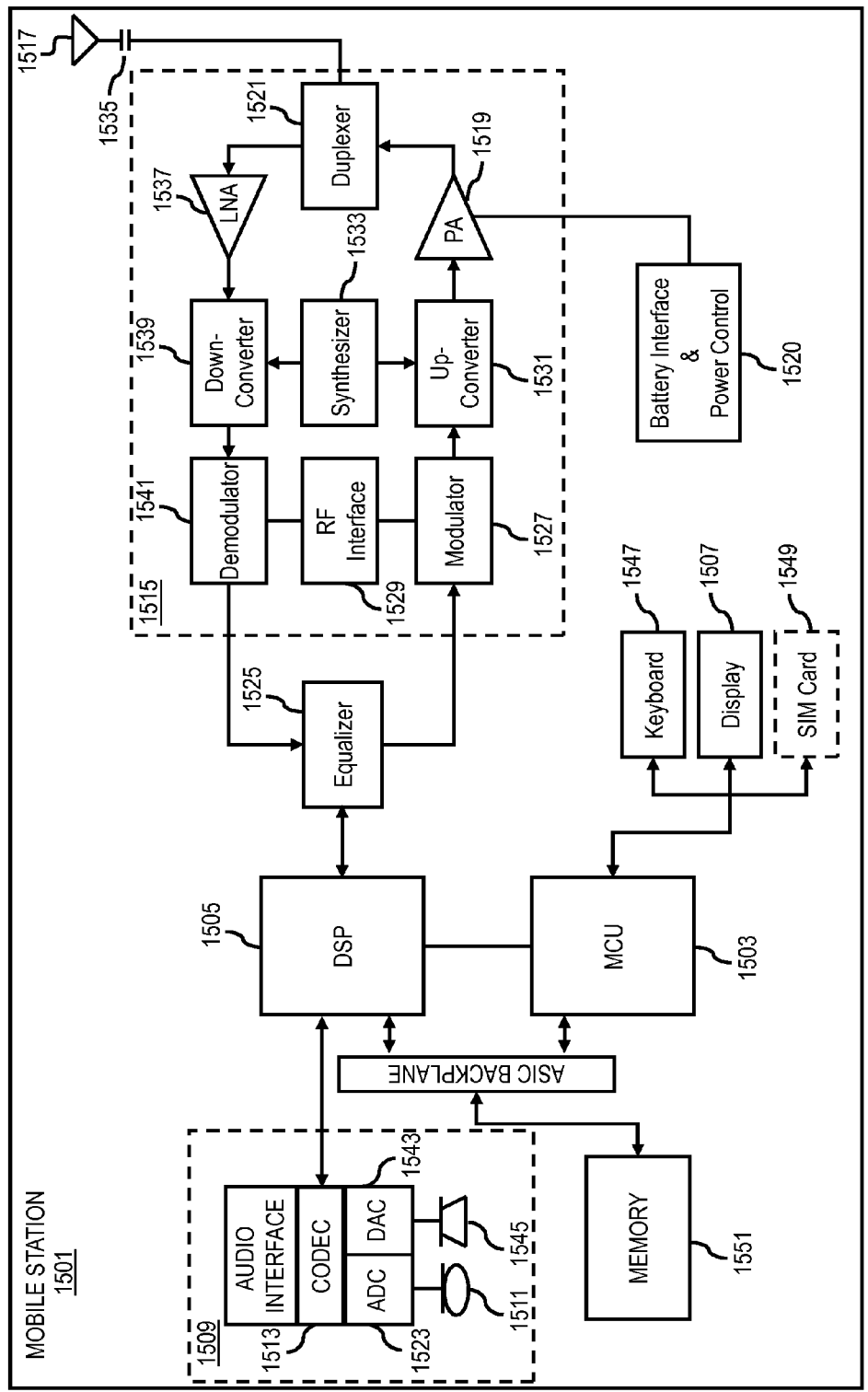
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of providing load balancing in multi-level distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of providing load balancing in multi-level distributed computations. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairment that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to provide load balancing in multi-level distributed computations. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining closure capability data associated with respective levels of a computational architecture, wherein the respective levels include, at least in part, a device level, an infrastructure level, and a cloud computing level, wherein the infrastructure level is part of a communication network, each of the device level and the cloud computing level are connected to, but separate from the communication network, and the communication network includes the Internet;
    determining functional flow information of (i) the respective levels, (ii) one or more nodes of the respective levels, or (iii) a combination thereof with respect to at least one set of one or more computation closures; and
    determining to cause, at least in part, processing of at least the closure capability data, the functional flow information, or a combination thereof to determine a distribution of the one or more computation closures among the respective levels, the one or more nodes, or a combination thereof, wherein
    the one or more computation closures correspond to one or more particular computation procedures to be performed.

2. A method of claim 1, wherein the processing of at least the closure capability data, the functional flow information, or a combination is further based, at least in part, on: (a) at least one cost function, (b) at least one computation migration rule, or (c) a combination thereof.

3. A method of claim 2, further comprising:
    processing the at least one cost function, the at least one computation migration rule, or a combination thereof to determine a cost value associated with at least a portion of the distribution of the one or more computation closures; and
    determining whether to initiate the distribution of the one or more computation closures based, at least in part, on a comparison of the cost value associated with the at least a portion of the distribution of the one or more computation closures against a threshold value.

4. A method of claim 1, further comprising:
    updating information associated with the closure capability data, the one or more computation closures, one or more executable states of the one or more computation closures, the functional flow information, or a combination thereof; and
    processing of at least the update information to determine a redistribution of the one or more computation closures among the respective levels, the one or more nodes, or a combination thereof.

5. A method of claim 4, wherein the redistribution includes, a least in part, a pause, an interruption, a resumption, an interaction, a termination, a rollback, or a combination thereof of at least a portion of the one or more computation closures.

6. A method of claim 1, further comprising:
    determining to cause, at least in part, retrieval of respective results of the one or more computation closures based, at least in part, on the distribution; and
    processing the respective results to generate an aggregated result.

7. A method of claim 1, wherein the distribution, the closure capability data, the functional flow information, an availability of at least a portion of the one or more computation closures at the respective levels, or a combination thereof are based, at least in part, on a service class information associated with at least one user of the at least one set of the one or more computation closures.

8. A method of claim 1, wherein the closure capability data includes, at least in part, data related to one or more computational branches, one or more computational elements, one or more resources, or a combination thereof associated with the respective levels, the one or more nodes, or a combination thereof.

9. A method of claim 1, wherein the processing of at least the closure capability data, the functional flow information, or a combination thereof is performed, at least in part, on traversal of at least one of the one or more computation closures from a first level of the respective levels to at least a second level of the respective levels, from a first node of the one or more nodes to at least a second node of the one or more nodes, or a combination thereof.

10. A method of claim 1, wherein the one or more computation closures include one or more static computation closures, one or more dynamic computation closures, or a combination thereof.

11. An apparatus comprising:
    at least one processor; and
    at least one memory including computer program code for one or more programs,
    the at least one memory and the computer program code configured to, with the at least one processor, cause the apparatus to perform at least the following, determine closure capability data associated with respective levels of a computational architecture, wherein the respective levels include, at least in part, a device level, an infrastructure level, and a cloud computing level, wherein the infrastructure level is part of a communication network, each of the device level and the cloud computing level are connected to, but separate from the communication network, and the communication network includes the Internet;

determine functional flow information of the respective levels, (ii) one or more nodes of the respective levels, or (iii) a combination thereof with respect to at least one set of one or more computation closures; and determine to cause, at least in part, processing of at least the closure capability data, the functional flow information, or a combination thereof to determine a distribution of the one or more computation closures among the respective levels, the one or more nodes, or a combination thereof, wherein the one or more computation closures correspond to one or more particular computation procedures to be performed.

12. An apparatus of claim 11, wherein the processing of at least the closure capability data, the functional flow information, or a combination is further based, at least in part, on: (a) at least one cost function, (b) at least one computation migration rule, or (c) a combination thereof.

13. An apparatus of claim 12, wherein the apparatus is further caused to:

process the at least one cost function, the at least one computation migration rule, or a combination thereof to determine a cost value associated with at least a portion of the distribution of the one or more computation closures; and determine whether to initiate the distribution of the one or more computation closures based, at least in part, on a comparison of the cost value associated with the at least a portion of the distribution of the one or more computation closures against a threshold value.

14. An apparatus of claim 11, wherein the apparatus is further caused to:

update information associated with the closure capability data, the one or more computation closures, one or more executable states of the one or more computation closures, the functional flow information, or a combination thereof; and determine a redistribution of the one or more computation closures among the respective levels, the one or more nodes, or a combination thereof.

15. An apparatus of claim 14, wherein the redistribution includes, a least in part, a pause, an interruption, a resumption, an interaction, a termination, a rollback, or a combination thereof of at least a portion of the one or more computation closures.

16. An apparatus of claim 11, wherein the apparatus is further caused to:

determine to cause, at least in part, retrieval of respective results of the one or more computation closures based, at least in part, on the distribution; and process the respective results to generate an aggregated result.

17. An apparatus of claim 11, wherein the apparatus is further caused to:

process service class information associated with at least one user of the at least one set of the one or more computation closures, wherein the distribution, the closure capability data, the functional flow information, an availability of at least a portion of the one or more computation closures at the respective levels, or a combination thereof are based, at least in part, on the service class information.

18. An apparatus of claim 11, wherein the closure capability data includes, at least in part, data related to one or more computational branches, one or more computational elements, one or more resources, or a combination thereof associated with the respective levels, the one or more nodes, or a combination thereof.

19. An apparatus of claim 11, wherein the processing of at least the closure capability data, the functional flow information, or a combination thereof is performed, at least in part, on traversal of at least one of the one or more computation closures from a first level of the respective levels to at least a second level of the respective levels, from a first node of the one or more nodes to at least a second node of the one or more nodes, or a combination thereof.

20. An apparatus of claim 11, wherein the device level includes a mobile phone further comprising:

user interface circuitry and user interface software configured to facilitate user control of at least some functions of the mobile phone through use of a display and configured to respond to user input; and display circuitry configured to display on the display at least a portion of a user interface of the mobile phone, the display and display circuitry configured to facilitate user control of at least some functions of the mobile phone.

* * * * *